(12) United States Patent
Prammer

(10) Patent No.: US 8,941,384 B2
(45) Date of Patent: Jan. 27, 2015

(54) RELIABLE WIRED-PIPE DATA TRANSMISSION SYSTEM

(75) Inventor: Manfred G. Prammer, Downingtown, PA (US)

(73) Assignee: Martin Scientific LLC, Downingtown, PA (US)

( * ) Notice: Subject to any disclaimer, the term of this patent is extended or adjusted under 35 U.S.C. 154(b) by 494 days.

(21) Appl. No.: 13/142,612

(22) PCT Filed: Dec. 23, 2009

(86) PCT No.: PCT/US2009/069434
§ 371 (c)(1),
(2), (4) Date: Aug. 10, 2011

(87) PCT Pub. No.: WO2010/078197
PCT Pub. Date: Jul. 8, 2010

(65) Prior Publication Data
US 2012/0176138 A1    Jul. 12, 2012

Related U.S. Application Data

(60) Provisional application No. 61/204,100, filed on Jan. 2, 2009, provisional application No. 61/206,550, filed on Feb. 2, 2009.

(51) Int. Cl.
*G01V 3/00* (2006.01)
*E21B 17/02* (2006.01)
(Continued)

(52) U.S. Cl.
CPC .............. *E21B 17/028* (2013.01); *E21B 17/003* (2013.01); *E21B 47/12* (2013.01); *E21B 41/0085* (2013.01)
USPC .......................................... 324/338; 324/642

(58) Field of Classification Search
CPC ... E21B 17/003; E21B 41/0085; E21B 47/00; E21B 47/12; G01V 3/30
USPC .......................................... 324/642, 333–375
See application file for complete search history.

(56) References Cited

U.S. PATENT DOCUMENTS 2,000,716 A    5/1935 Polk
2,379,800 A    7/1945 Hare
(Continued)

FOREIGN PATENT DOCUMENTS

EP          0481865       3/1996
WO     WO 2009/143409   11/2009
WO     WO 2010/078197    7/2010

OTHER PUBLICATIONS

Okubo, JP 2007208431 machine translation, Aug. 16, 2007, Copyright (C) 2007.*

(Continued)

*Primary Examiner* — Vinh Nguyen
*Assistant Examiner* — Raul Rios Russo
(74) *Attorney, Agent, or Firm* — Baker & Hostetler LLP

(57) ABSTRACT

A high-frequency data and/or power transmission system suitable for downhole use including signal/power couplers, transmission line segments and signal repeaters. Signals and power are/is transmitted between couplers and/or between couplers and repeaters by means of electromagnetic resonance coupling. In at least a portion of the system, the transmission line segments form parallel data paths and the repeaters provide crossover capability between the data/power paths, thereby significantly improving reliability. The invention also includes methods of transmitting data and/or distributing high-frequency power through a downhole transmission system including multiple data/power paths and multiple crossovers wherein a fault location in one data/power path is bypassed by routing data and/or power to a parallel data/power path by means of electromagnetic resonance coupling.

48 Claims, 22 Drawing Sheets

(51) Int. Cl.
*E21B 17/00* (2006.01)
*E21B 47/12* (2012.01)
*E21B 41/00* (2006.01)
*G01R 27/04* (2006.01)

(56) References Cited

U.S. PATENT DOCUMENTS

| | | | |
|---|---|---|---|
| 3,713,089 A | 1/1973 | Clacomb | |
| 3,805,606 A | 4/1974 | Stelzer et al. | |
| 4,087,781 A | 5/1978 | Grossi et al. | |
| 4,215,426 A | 7/1980 | Klatt | |
| 4,220,381 A | 9/1980 | van der Graaf | |
| 4,605,268 A | 8/1986 | Meador | |
| 4,788,544 A | 11/1988 | Howard | |
| 4,914,433 A | 4/1990 | Galle | |
| 5,122,662 A * | 6/1992 | Chen et al. | 250/269.3 |
| 6,123,561 A | 9/2000 | Turner et al. | |
| 6,670,880 B1 | 12/2003 | Hall et al. | |
| 6,727,707 B2 | 4/2004 | Sinclair et al. | |
| 6,950,034 B2 | 9/2005 | Pacault et al. | |
| 6,958,704 B2 | 10/2005 | Vinegar et al. | |
| 7,025,130 B2 | 4/2006 | Bailey et al. | |
| 7,096,961 B2 | 8/2006 | Clark et al. | |
| 7,156,676 B2 | 1/2007 | Reynolds, Jr. | |
| 7,224,288 B2 | 5/2007 | Hall et al. | |
| 7,228,902 B2 | 6/2007 | Oppelt | |
| 7,248,177 B2 * | 7/2007 | Hall et al. | 340/854.8 |
| 7,252,160 B2 | 8/2007 | Dopf et al. | |
| 7,276,910 B2 * | 10/2007 | Prsha et al. | 324/326 |
| 7,277,026 B2 | 10/2007 | Hall et al. | |
| 7,299,867 B2 | 11/2007 | Hall et al. | |
| 7,319,410 B2 * | 1/2008 | Hall et al. | 340/854.8 |
| 7,362,235 B1 | 4/2008 | Normann et al. | |
| 7,400,262 B2 | 7/2008 | Chemali et al. | |
| 7,525,264 B2 | 4/2009 | Dodge | |
| 7,535,377 B2 | 5/2009 | Hall et al. | |
| 7,777,644 B2 | 8/2010 | Madhavan et al. | |
| 7,806,191 B2 | 10/2010 | Braden et al. | |
| 7,852,232 B2 | 12/2010 | Hall et al. | |
| 8,033,329 B2 | 10/2011 | Montgomery et al. | |
| 8,049,506 B2 | 11/2011 | Lazarev | |
| 8,072,347 B2 | 12/2011 | Santoso et al. | |
| 8,109,329 B2 | 2/2012 | Bray et al. | |
| 8,115,495 B2 | 2/2012 | Harmon | |
| 8,118,093 B2 | 2/2012 | Hassell et al. | |
| 8,120,508 B2 | 2/2012 | Madhavan et al. | |
| 8,130,118 B2 | 3/2012 | Hall et al. | |
| 8,704,677 B2 | 4/2014 | Prammer | |
| 2003/0171109 A1 * | 9/2003 | Ballweber et al. | 455/323 |
| 2004/0104797 A1 * | 6/2004 | Hall et al. | 336/132 |
| 2005/0212530 A1 | 9/2005 | Hall et al. | |
| 2006/0254764 A1 | 11/2006 | Zuilekom | |
| 2006/0260801 A1 * | 11/2006 | Hall et al. | 166/117.5 |
| 2007/0247328 A1 | 10/2007 | Petrovic et al. | |
| 2007/0279063 A1 * | 12/2007 | Beard | 324/355 |
| 2008/0012569 A1 * | 1/2008 | Hall et al. | 324/367 |
| 2008/0180333 A1 * | 7/2008 | Martiskainen et al. | 343/722 |
| 2009/0153424 A1 * | 6/2009 | Ryou et al. | 343/767 |

OTHER PUBLICATIONS

American Petroleum Institute, "Specification for Rotary Drill Stem Elements—API Specification 7", 40$^{th}$ edition, Nov. 2001, API Publishing Services, Washington, DC, Fig. 16 and Table 16, pp. 24-25.

Bourgoyne, Jr. et al., "Applied Drilling Engineering", SPE Textbook Series, vol. 2, Society of Petroleum Engineers, Richardson, TX, 1991, Chapter 1: Rotary Drilling Process, 42 pages.

Denison, E.B., "High Data-Rate Drilling Telemetry System", Journal of Petroleum Technology, Feb. 1979, 31(2), 155-163.

Devereux, S., "Drilling Technology in Nontechnical Language", Penn Well Corp., Tulsa, OK, 1999, Chapter 5: Rig Selection and Rig Equipment, 22 pages.

Economides et al., "Petroleum Well Construction", Watters and Dunn-Norman, John Wiley & Sons, West Sussex, UK, 1998, Chapter 1: Introduction to Drilling and Well Completions, 28 pages.

Pixton, D.S., "Very high-speed drill string communications network—Report # 41229R14", Novatek Engineering, Provo, UT, Jun. 2005, 59 pages.

Pixton, D.S., "Very high-speed drill string communications network—Report # 41229R06", Novatek Engineering, Provo, UT, Mar. 2003, 10 pages.

Prammer et al., "Field Testing of an Advanced LWD Imaging Resistivity Tool", Society of Petrophysicists and Well-Log Analysts 48$^{th}$ Annual Loggings Symposium, Jun. 3-6, 2007, Austin, TX, 1-15.

Robinson, L.H., "Exxon completes wireline drilling data telemetry system", Oil & Gas Journal, Apr. 14, 1980, 137-149.

Seaton et al., "New MWD-Gamma system finds many field applications", Oil & Gas Journal, Feb. 21, 1983, 80-84.

Shokrollahi, A., "Raptor Codes", IEEE Transactions on Information Theory, Jun. 2006, 52(6), 2551-2567.

* cited by examiner

A-A'

RELIABLE WIRED-PIPE DATA TRANSMISSION SYSTEM

CROSS-REFERENCE TO RELATED APPLICATIONS

This application is the National Stage of International Application No. PCT/US2009/069434, filed Dec. 23, 2009, which claims the benefit of U.S. Provisional Application No. 61/204,100, filed Jan. 2, 2009, and U.S. Provisional Application No. 61/206,550, filed Feb. 2, 2009, the disclosures of which are incorporated herein by reference in their entireties for any and all purposes.

TECHNICAL FIELD

The present invention relates to the field of data transmission systems, in particular to data transmission systems suitable for downhole use, such as on a drill string used in oil and gas exploration, or on completion strings, or on casing strings. The present invention is especially useful for obtaining downhole data or measurements while drilling as well as sending commands from the surface to downhole drilling equipment, downhole actuators or to other downhole instrumentation. In addition, the present invention is also useful for performing measurements and gathering data along a borehole while the borehole is being drilled.

BACKGROUND

There are a number of textbooks available that describe the processes involved in drilling for oil and gas. Examples of such textbooks are "Petroleum Well Construction" by Economides, Watters and Dunn-Norman, John Wiley & Sons, West Sussex, UK, 1998; "Applied Drilling Engineering" by Bourgoyne, Jr., Chenevert, Millhelm and Young, Jr., SPE Textbook Series, Vol. 2, Society of Petroleum Engineers, Richardson, Tex., 1991; or "Drilling Technology—In Nontechnical Language" by S. Devereux, PennWell Corp., Tulsa, Okla., 1999. Reference may be made to these textbooks for an understanding of general drilling processes.

A drilling operation suitable for implementing the present invention is shown in FIG. 1. The drill rig 10 drives a drill string 11, which is composed of a large number of interconnected sections 30, called pipe joints. The bottom of the drill string is composed of heavy-weight pipe sections 13, called drill collars. In a typical drilling operation, the rig rotates the drill string and thus the bottom hole assembly (BHA) 14. The BHA 14 may contain various instrumentation packages, possibly a mud motor or a rotary-steerable system, stabilizers, centralizers, drill collars and the drill bit 15. The drill string and all downhole components are hollow, allowing drilling fluids to be pumped from the surface to the bit, with the drilling fluid returning to the surface in the outer annulus between the drill string and the formation for cleaning and re-circulation. The drill string 11 may contain additional sections of heavy-weight drill pipe and/or specialized equipment such as drilling jars.

The two most common drive systems are the rotary-table system and the top-drive system. The rotary-table system, shown in FIG. 1, engages the drill string through the kelly bushing 16 and the kelly 17, causing the drill string 11 to rotate while the kelly 17 is free to move up and down as the pipe is lowered into the ground or is lifted from the borehole. As the borehole deepens, pipe joints 30 are periodically added to the top of the drill string 11 by means of rotary shoulder connections that provide mechanical strength and hydraulic seals. A top-drive system does not require a kelly 17; instead, the entire drive mechanism moves up and down with the top end of the drill string 11. A top-drive system facilitates and accelerates the drilling process; however, it is also more expensive than a rotary-table system.

FIG. 2 shows a commonly used pipe joint 30 comprising a "box" tool joint 31 at the top, a long tubular section 32 and a "pin" tool joint 33 at the bottom. A typical length for a pipe joint is 31 ft. (about 9.5 m), but deviations of around +/−1 ft. are commonplace. Both pin 33 and box 31 are equipped with conical threads 34 that, when joined, form a rotary connection. The two primary purposes of the connection are the transmission of mechanical forces such as torque, tension and compression between pipe joints 30 and to provide a liquid-tight metal-to-metal seal at the outer shoulders 35. The connection is typically made-up using pipe tongs or motorized spinners, a process that puts the pin 33 under tension, the box 31 under compression and the metal seal interface shoulders 35 also under compression. This compressional seal load must exceed the tensional loads the seal 35 experiences during bending and flexing in the hole to keep the metal-to-metal seal intact. The interior walls of the pipe joint 30 may be coated with a high-performance epoxy compound. This compound is a high-quality dielectric insulator that inhibits corrosion of the metallic pipe and reduces friction losses in the fluid. Commercially available examples of such pipe coating compounds are "TK-236" or "TK-34", both available from Tuboscope, Tex., Houston, U.S.A.

The downhole instrumentation packages contained in the BHA 14 collect information about the drilling process, about the formations being drilled, and about the fluids contained in those formations. In current practice, most of this data is stored in downhole memory and later retrieved after the instrumentation has been brought back to the surface. A very small and compressed amount of information, however, is typically sent in real time to the surface using one of the currently available mud-pulse telemetry systems. Such systems induce pressure pulses within the drilling fluid column contained by the drill string to convey a digital signal to the surface at rata rates of around 0.1-15 bits/sec. However, the amount of information available in real time through a mud-pulse system is inadequate by far for today's complex drilling operations that require accurate, real-time borehole data.

Commercially viable reservoirs tend to be much more complex than those exploited in the past and the recovery rates of the oil or gas in place must be constantly increased to make the remaining hydrocarbon reservoirs last longer. This also means that well trajectories can no longer be fully pre-planned based on seismic data or data from offset wells. Instead, well trajectories are more and more determined and fine-tuned while a hole is being drilled. To accomplish this task, formation evaluation data must be brought to the surface and must be studied and interpreted while drilling is progressing. The interpretation results may or may not require adjustments to the well trajectory, which are communicated back to the rig site. The rig equipment in turn communicates these adjustments to the downhole equipment. An example for a downhole imaging device that generates large amounts of formation evaluation data while a hole is being drilled is described in "Field Testing of an Advanced LWD Imaging Resistivity Tool," by Prammer et al., SPWLA 48th Annual Logging Symposium, Austin, Tex., 2007. Since the drilling process is relatively slow and formation data can be compressed by the downhole electronics, a transmission rate along the drill string of about 100-10,000 bits/second (bps) is required. In addition, the command channel from the surface to the downhole instrumentation and the drilling system requires from time to time a transmission rate of approximately 10-1,000 bps.

A need to transmit data from a downhole location reliably has been recognized for a very long time. For a discussion of previous attempts to solve this difficult problem, reference is made to PCT/US2009/00449949, filed May 22, 2009. The contents of this application are hereby incorporated by reference in their entirety.

Application PCT/US2009/00449949, filed May 22, 2009 describes a telemetry system based on coupling elements and transmission elements buried within the fusion-bonded epoxy (FBE) coating often applied to the inner bore of high-performance drill pipe for corrosion protection. These elements transmit radiofrequency signals that bridge the gap between pipe joints based on capacitive/dielectric coupling. The coupling mechanism is dissipative, requiring each pipe joint to contain an active signal repeating element.

A commercial system known as "IntelliPipe" or "IntelliServ", described in, for example, U.S. Pat. No. 6,670,880 to Hall et al., is termed a "wired pipe" system ("WPS") because signals are conveyed via armored coaxial cable deployed in the inner bore of the drill string. Details of the Hall WPS can be found in "Very High-Speed Drill String Communications Network, Report #41229R14," June 2005, by D. S. Pixton, DOE Award Number DE-FC26-01NT41229, available from the website of the U.S. Department of Energy at www.doe.gov.

As discussed above, a drill string is made up of a multitude of pipe joint segments, which are each typically about 30-32 ft. long and which are joined together by rotary connections. The Hall WPS takes advantage of special, high-performance connections, known as double-shouldered rotary tool joints. Double-shouldered tool joints are machined to exacting specifications such that mating tool joints not only engage at the outer, sealing shoulder, but also at an inner shoulder formed by the flat face of the pin 33 and the flat back wall of the box 31. The Hall WPS uses these secondary contact surfaces to house ferrite-based ring-shaped magnetic couplers that transmit electromagnetic signals from one segment of armored coaxial cable contained in a first pipe joint to the cable segment contained in the neighboring pipe joint. When the WPS rotary joints are made-up, pairs of embedded coupling elements form closed circuits of high magnetic permeability, i.e. ferrite-core transformers. The transmitted signal is attenuated as it travels along the drill string through a multitude of cable segments and transformers and needs to be periodically reconditioned and brought back to full signal strength. These tasks are performed by repeater subs that are inserted in the drill string at regular intervals that range between approximately 1,000 ft.-2,000 ft.

The transformers in the Hall WPS are based on brittle ferrite core material. The ferrite half-cores protrude from the face of the joint pin and from the back wall from the joint box. During the make-up operation, facing ferrite half-cores are expected to rotate against each other and to force each other into the face of the pin and into the box back wall, respectively. Since the ferrite half-cores need to move in and out of the pin face and the box back-wall, respectively, it is not possible to hermetically seal the couplers from the environment. The intense downhole pressure of up to 30,000 psi (approximately 200 MPa) forces drilling fluid into and behind the couplers. The drilling fluid carries and lodges solid particulates such as sand, barite, metal filings and/or drilling chips of any size behind the ferrite cores, thereby jamming them and inhibiting their retraction. Once a ferrite core is stuck in the protruding position, it will be destroyed by the full compressional force exerted during the make-up operation. However, commercial drill pipe is expected to withstands hundreds to thousands make-up/break-out cycles under harsh and dirty conditions, a number that is not attainable if the pipe contains fragile, exposed components subject to repeated, abrasive action such as those experienced by the Hall WPS ferrite transformers.

Furthermore, drill pipe is routinely exposed to mechanical shocks during normal drill rig operations. For example, during rig-down, individual pipe joints slide down an inclined ramp from the rig floor to the ground, where, at the end of the ramp, the pipe segments slam into a stopping board. When the pipe is hoisted vertically in the rig, it frequently and violently slams down on the metallic rig floor and/or on other rotary connections. Any of these common impacts that ordinary drill pipe is expected to withstand can cause open or concealed damage to the Hall couplers that are exposed on the pin face. A compromised Hall coupler, although apparently still functional during checkout under atmospheric conditions on the surface, is likely to break under the combined action of high temperature, very high pressures and the aggressive fluids found in downhole conditions. Furthermore, since the Hall transformers are moving parts and therefore are not hermetically sealable, their electrical connections and the interior O-ring seals are subjected to the corrosive action of the drilling fluids, causing electrical and mechanical degradation and breakdowns simply by accumulating downhole hours.

A goal of the present invention is a data transmission system that uses non-moving, hermetically-sealed signal couplers that are compatible with the harsh conditions of drilling operations at the surface and underground.

The fundamental WPS reliability problem has been widely recognized; see, for example, U.S. Pat. Appl. 2004/0217880 A1 by Clark et al. Clark et al. calculate that for a 15,000 ft. long WPS to exhibit a desirable mean time between failure (MTBF) of about 500 hours, each of the wired-drill pipe components much achieve an MTBF of at least about 250,000 hours (28.5 years). Such an MTBF is unrealistic for most electromechanical systems, let alone downhole systems containing moving parts such as the Hall couplers. Clark et al. disclose a system for troubleshooting a failed WPS. However, the very fact that such systems fail frequently and require often and labor-intensive troubleshooting intervention renders them unsuitable for use under the harsh and rushed conditions of oil and gas drilling.

A goal of the present invention is a wired-pipe data transmission system that achieves good reliability over its entire design lifetime and that can be built from individual components with reliability values that are typical of electrical components operating under harsh downhole conditions.

Another goal of the present invention is a data transmission system that fails gradually, allowing the continuation of drilling operations, while simultaneously the failure is detected, diagnosed and reported to an operator, who may choose to replace the pipe segment containing the failed element at the next opportunity. Such opportunities exist when the drill string must be removed from the hole, because of, e.g., a worn-out drill bit or a change in borehole diameter.

Existing wired-pipe systems rely on repeater subs that periodically refresh the transmitted signal. These highly-complex subs, of which 10-20 are needed per drill string, constitute a large capital expense burden and consume large amounts of typically "Size D" primary lithium cells as their power source. These large-size lithium batteries are expensive to manufacture and pose a fire hazard during transport, operation and disposition. Another goal of the present invention is the replacement of these expensive and dangerous repeaters with small and inexpensive elements that are safe to handle, to store and to transport.

SUMMARY

The above-mentioned goals and advantages are achieved by providing a data and/or power transmission system suitable for downhole use including signal and/or energy couplers, transmission line segments and signal repeaters. Signals and/or power are exchanged between couplers and/or between couplers and repeaters by means of electromagnetic resonance ("EMR"). In at least a portion of the system the transmission line segments form parallel data paths and the repeaters provide crossover capability between these data paths. By virtue of EMR and the provision of redundant transmission elements, faulty transmission elements are automatically isolated from the functioning portion of the transmission system, which continues to operate in the presence of single or multiple faults. The invention also includes methods of transmitting data and/or power through a downhole transmission system comprising multiple data paths and multiple crossovers by means of EMR. Fault locations in one data/power path are bypassed by a parallel path through crossover circuits. The detailed characteristics of such a system will be apparent from the following detailed description.

DETAILED DESCRIPTION OF ILLUSTRATIVE EMBODIMENTS

Figure 1:
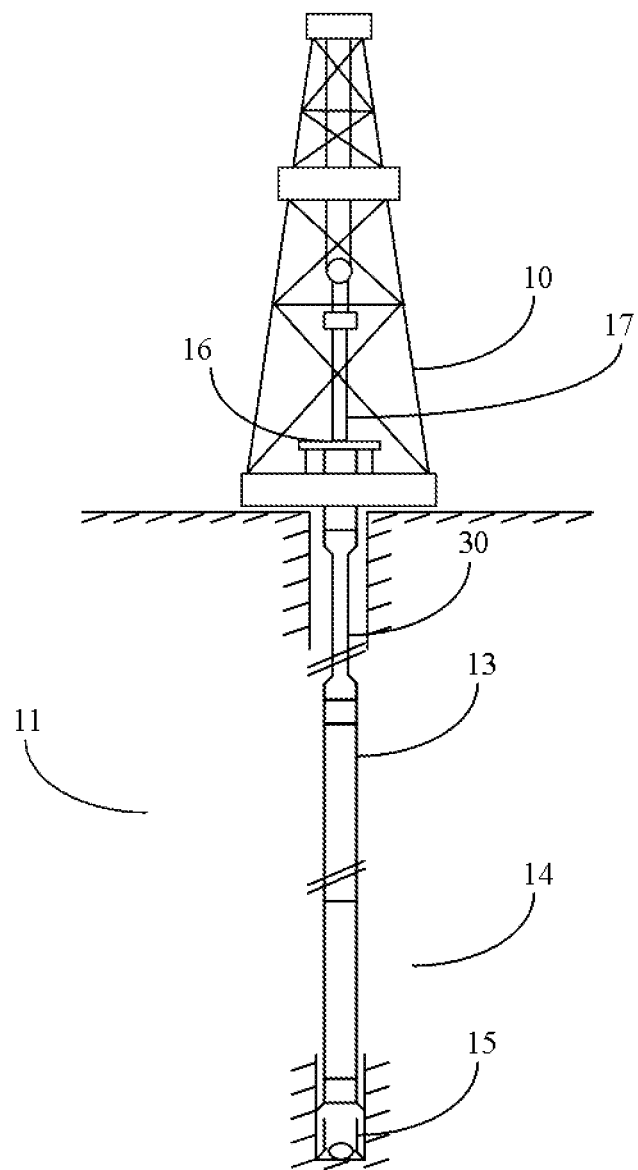
FIG. 1 is a schematic representation of a conventional drilling environment showing various downhole components.
Figure 2:
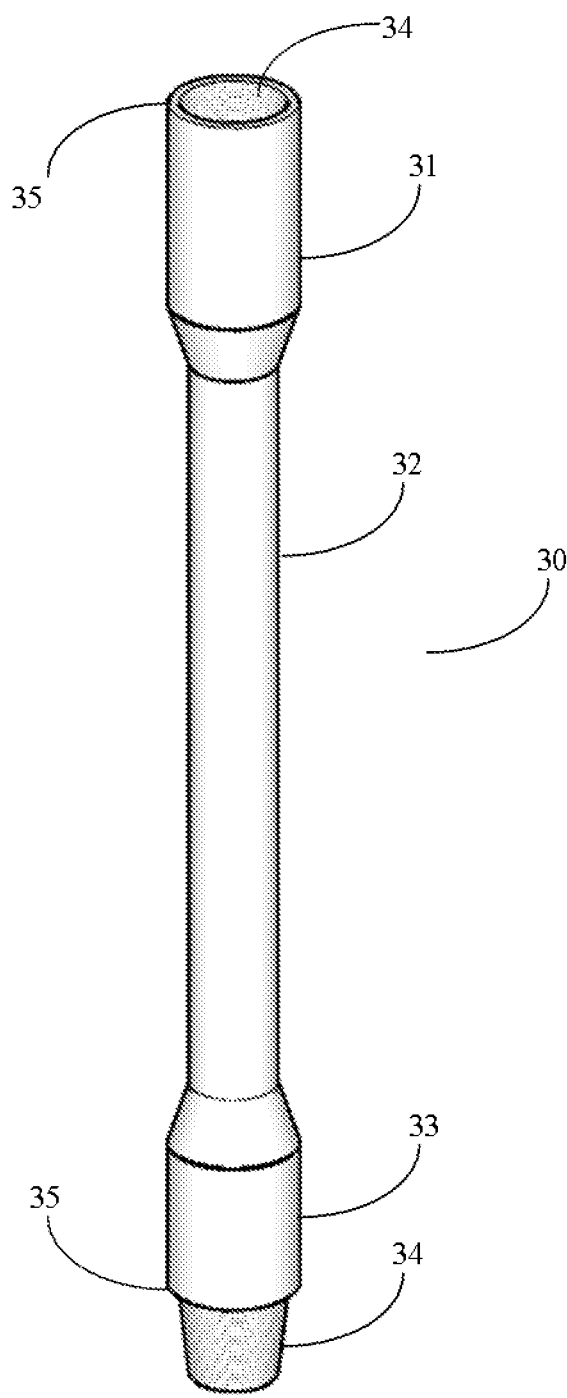
FIG. 2 is a perspective view of a conventional pipe joint with rotary connections.
Figure 3:
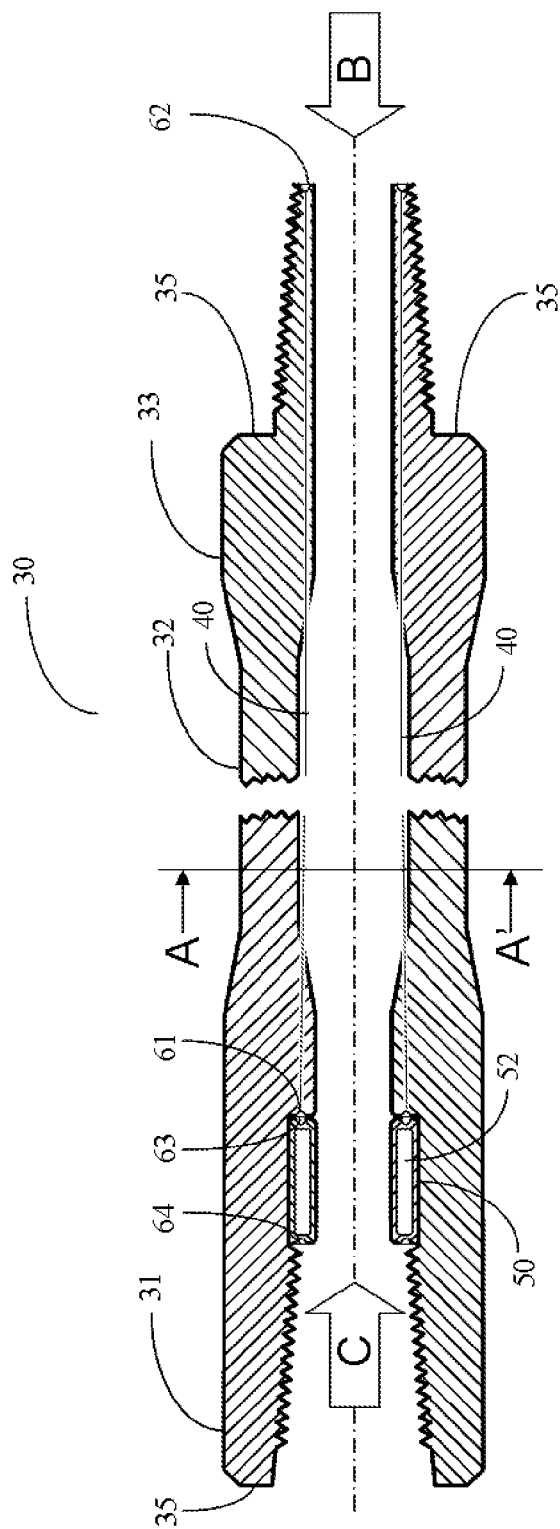
FIG. 3 is a conceptual drawing of a drill pipe joint according to the present invention, sectioned parallel to the main axis and with elements of the data transmission system installed.

In an exemplary embodiment of the present invention, signals, data and/or power are carried redundantly over two, parallel transmission lines mounted within each pipe joint. Preferably, the transmission lines are located as far away from each other as possible such that a damaging event destroying one transmission line is unlikely to also damage the other transmission line. FIG. 3 shows a conceptual drawing of a single pipe joint 30 sliced parallel to its axis, with two transmission lines 40, a repeater box 50 and electromagnetic resonance ("EMR") couplers 61 and 62 installed. The box 31 of pipe joint 30 is back-bored by approximately 2 inches (51 mm) to accommodate the repeater box 50. The repeater box 50 houses the EMR couplers 63 and 64. Within the repeater box 50 and sealed from the outside are located numerous typically cylindrically shaped cavities 52 that may house electronic circuits and batteries. Adjacent cavities 52 may be joined together to simplify electrical connections or to house odd-shaped electrical components. The inwards-facing EMR coupler 63 interfaces with the box-mounted EMR coupler 61. The box-mounted EMR coupler 61 is electrically connected via transmission lines 40 to the pin-mounted EMR coupler 62. When the connection is made, the pin 33 of the adjacent pipe joint engages the outwards-facing side of the repeater box 50 at shoulders 35 such that the pin-mounted EMR coupler of the adjacent pipe joint interfaces with EMR coupler 63. Thus, an assembled drill pipe contains a continuous chain of transmission lines 40 that extend the length of tubular section 32, EMR couplers 61 and 63 and repeater boxes 50 with EMR couplers 62 and 64. Such a chain is capable of transmitting high-speed telemetry data in both directions via radiofrequency carrier signals that are modulated with high-speed data. Such a chain is also capable of transmitting high-frequency power useful for powering repeaters, sensor electronics and for recharging rechargeable batteries contained in repeaters and/or sensor electronics.

Figure 16:
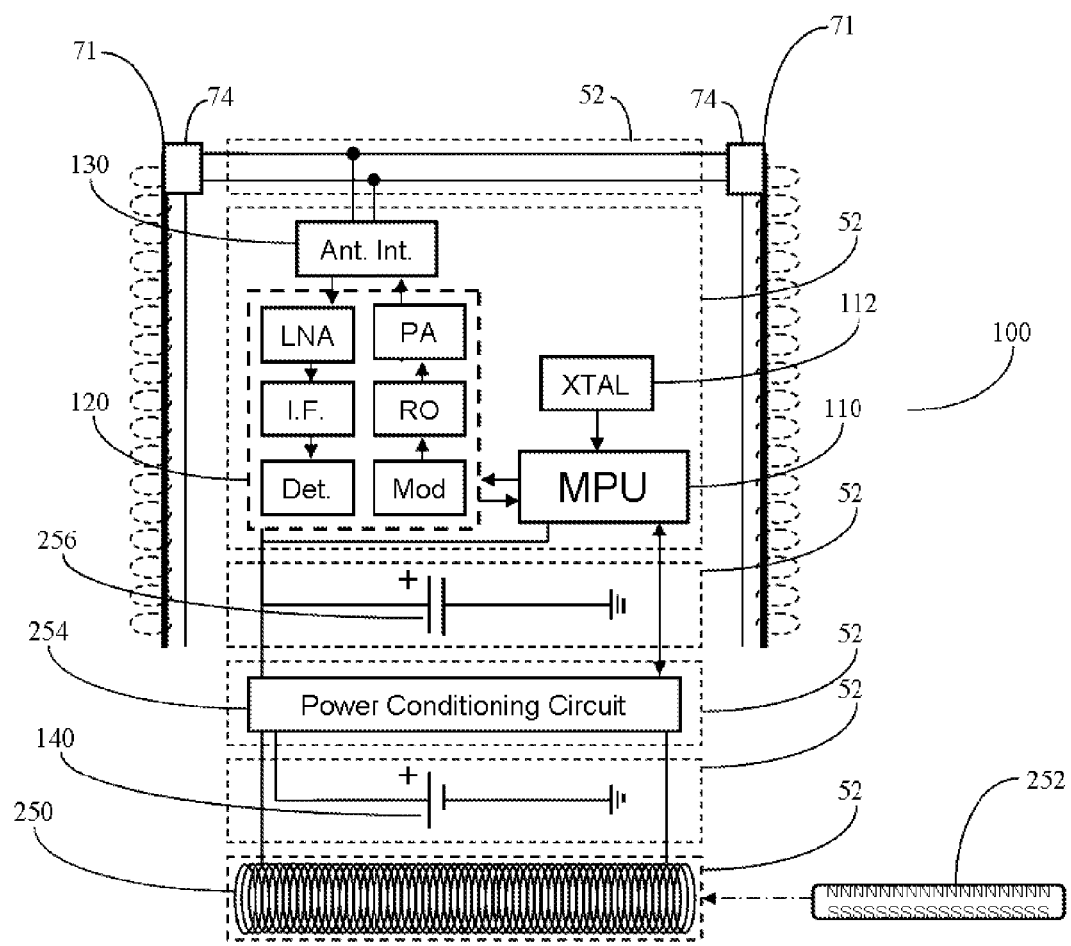
FIG. 16 is a conceptual circuit block diagram of one portion of an active repeater box including an energy harvesting device and energy processing circuitry.

The process of back boring a tool joint box is specified in the document "Specification for Rotary Drill Stem Elements—API Specification 7," 40$^{th}$ Edition, November 2001, FIG. 16 and Table 16, pp. 24-25, American Petroleum Institute, API Publishing Services, Washington, D.C. The processes of boring the tool joints and routing a coaxial cable through a tool joint, as well as the process of routing a coaxial cable through the tubular are detailed, e.g. in the report "Very High-Speed Drill String Communications Network, Report #41229R14," June 2005, by D. S. Pixton. The contents of these documents are hereby incorporated by reference in their entireties.

The majority of the repeater boxes 50 are passive devices without power sources. These passive repeaters transfer signals and/or power instantaneously and in both directions by means of EMR coupling at radio frequencies and short internal transmission lines.

Typically, one out of three repeater boxes 50 contains active circuitry that receives telemetry signals, buffers and verifies the information contained therein and then re-transmits the information modulated on a radiofrequency carrier signal. These active repeaters are also tuned to the operating frequency and also operate on the principle of EMR. Each active repeater contains its own power supply, which may be a primary cell or battery, a rechargeable battery, energy-harvesting circuitry or a combination thereof. Preferably, the active repeaters are more or less evenly spaced along the drill string with a typical separation between active repeaters of about 93 ft. (about 28 m), which is equal to three pipe joints or one "pipe stand". In normal operation, active repeaters communicate with their next nearest neighbors at a distance of 28 m via the intermediate chain of transmission lines and passive repeaters. However, active repeaters can also receive signals from more distant transmitters, e.g. at distances of 56 m and/or 85 m, a feature that allows automatic bridging over non-functional active repeaters.

Figure 4:
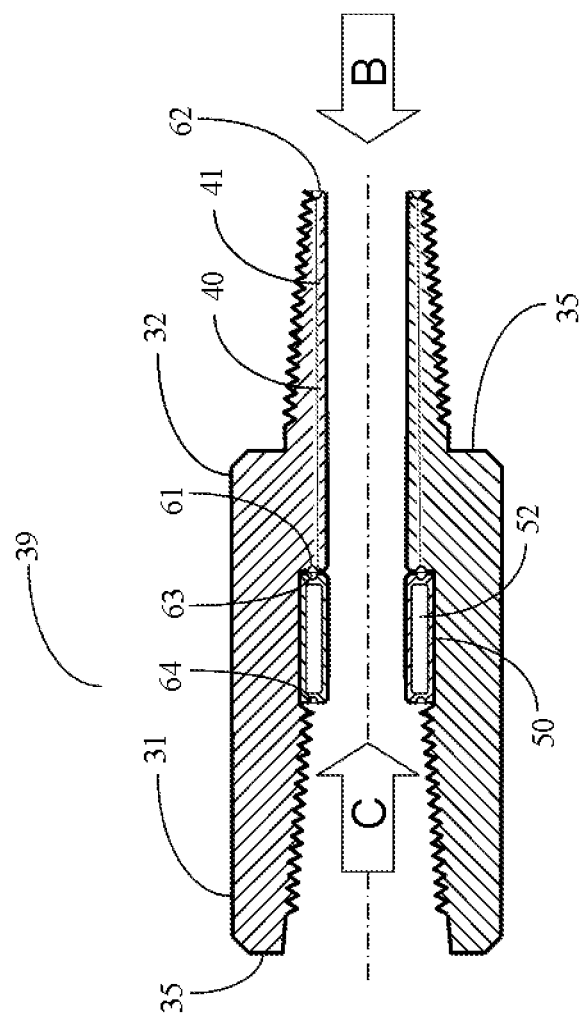
FIG. 4 is a conceptual drawing of a short joint according to the present invention, sectioned parallel to the main axis and with elements of the data transmission system installed.

FIG. 4 shows a short or "pup" joint 39, consisting of a box tool joint 31 and a pin tool joint 32 welded together without an intermediate tubular. The box is back bored and houses a repeater box 50. The transmission lines 40, connecting EMR couplers 61 and 62, are contained in the routing channels 41. The purpose of the pup joint is the introduction of a repeater at any desired location within the data transmission chain without expending the full length of a pipe joint. As discussed below, active repeater boxes 50 may implement sensing functions in addition to their data telemetry functions.

The need for introducing such local active repeaters may also arise when drill pipe elements conforming to the Hall WPS are introduced into the present system. Such Hall-style elements, when used as part of the present data transmission system, disrupt the EMR effect and introduce significant signal attenuation. This attenuation is compensated for by placing active repeaters above and/or below the Hall-style element or elements.

Figure 5:
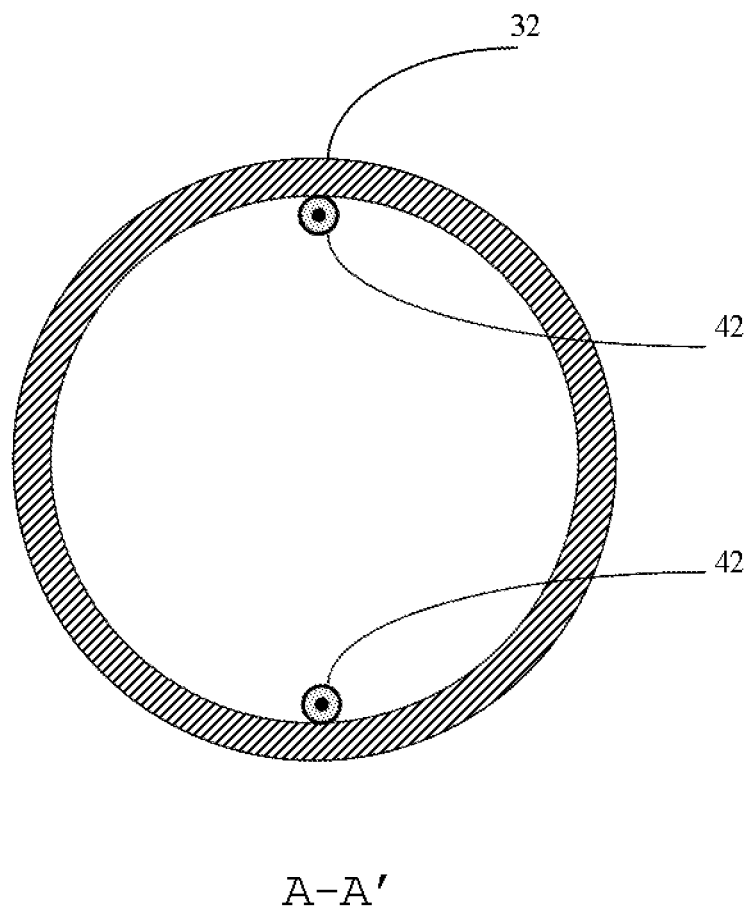
FIG. 5 is a cross-sectional view of the pipe joint shown in FIG. 3 along the plane A-A'.

A cross sectional view cutting through the tubular 32 and the transmission lines 40 along the plane A-A' is shown in FIG. 5. The transmission lines are implemented as flexible, steel-armored coaxial cables 42. Preferably, the cables 42 are of the low-loss variety suitable of operation up to 3 GHz. Cables with diameters of around 0.250" (6.4 mm), with solid or stranded inner conductor with a diameter of around 1 mm and with solid polytetrafluoroethylene (PTFE) as dielectric are suitable. The cables 42 are terminated at each end by miniature high-temperature radiofrequency connectors such as modified SMB or modified MCX connectors (not shown). These connectors are modified to have armored conical shoulders that are welded to the cable's outer armor jacket. The connectors fit into corresponding mounting holes in the tool joints where conical internal shoulders mate with the conical connector shoulders and thereby apply a tensional pre-load to the coaxial cable armor. The preferred characteristic impedance range of the coaxial cable 42 is 25-100 ohm. The preferred characteristic impedance value of the coaxial cable 42 is about 50 ohm.

Figure 6:
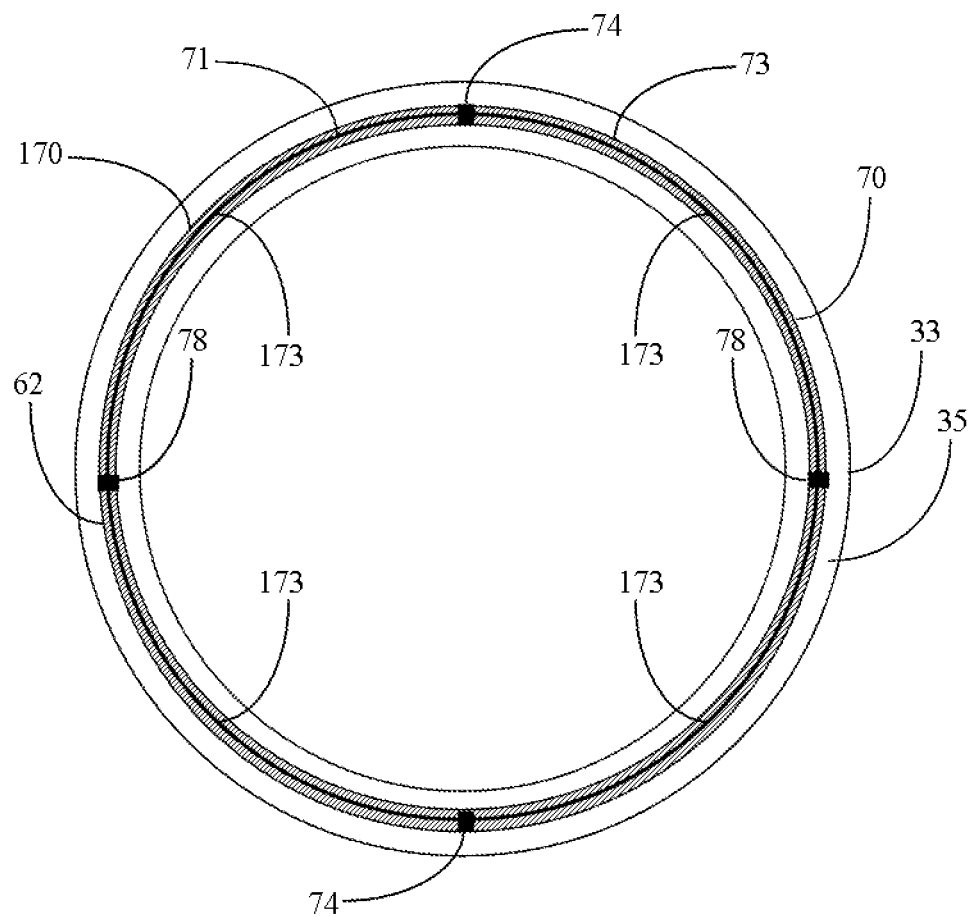
FIG. 6 is the view labeled "B" in FIGS. 3 and 4, showing the pin end.

As shown in FIG. 6, which is view "B" in FIGS. 3 and 4, the face of the pin 33 houses an EMR coupler 62 comprised of a circular groove 70 of approximately 4-5 mm depth. The walls of groove 70 are coated with electrically highly conductive layers 73 such as a plasma-spray applied copper film. The layer thickness should be at least three times the electrical skin depth at the resonance frequency. In the frequency ranges of interest (VHF), a conductive layer thickness of about 0.001" (24.5 micron) is typically sufficient. Buried within the groove 70 at a depth of approximately 2 mm below the surface is a circular antenna 71. The antenna 71 is implemented using high-frequency microstrip technology and consists of multiple wire segments 173 of approximately equal length and of capacitor blocks 74 and 78. The wire segments 173 are electrically highly conductive silver-over-copper traces about 1-2 mm wide and about 0.001" (24.5 micron) thick, printed on dielectric multi-layer laminate 170 of about 2-3 mm total thickness. The capacitor blocks 74 and 78 consist of surface-mount devices (SMD) that are embedded in the laminate. The antenna 71 is connected to two radiofrequency, high-temperature connectors 174 (not shown in FIG. 6) located below groove 70 close to capacitor blocks 74. The connectors 174 mate with another set of connectors that are attached to coaxial cables 40 (also hidden from view in FIG. 6). The entire assembly is encased in high-temperature potting material by completely filling the groove 70 with such non-conductive, dielectric potting material, preferably applied under vacuum or very-low pressure conditions.

The antenna 71 is divided into segments with one cable attached per segment. In this configuration, the segments may either (a) resonate together in coherence as they are strongly coupled to other segments in a proximate coupler and thus are also strongly coupled to each other, or (b) experience a partial shut-down where one segment goes off-resonance and therefore off-line and the remaining segment(s) resonate as it (they) is (are) still being coupled to multiple segments in a proximate coupler.

Figure 7:
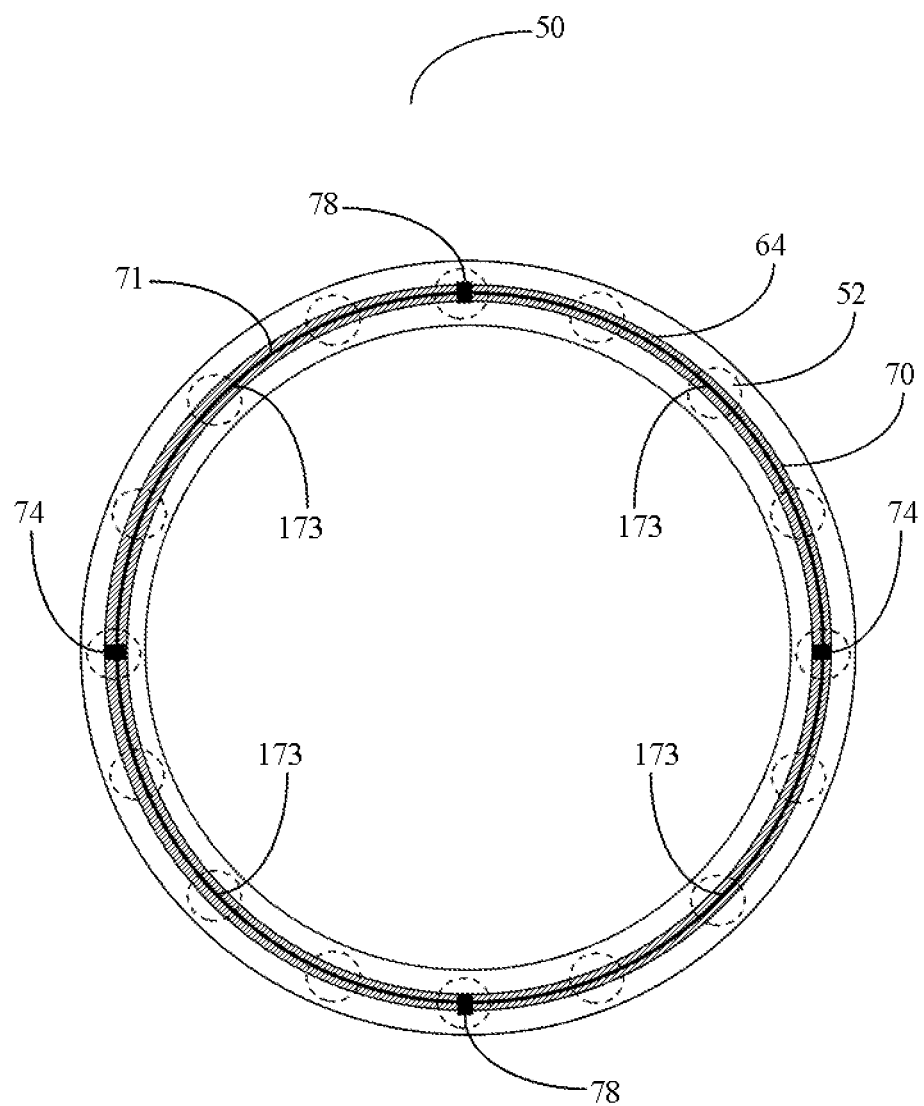
FIG. 7 is the view labeled "C" in FIGS. 3 and 4, showing the repeater box end.

The head-on view of the repeater box 50, i.e. the view labeled "C" in FIGS. 3 and 4 is shown in FIG. 7. The repeater box 50 contains in its outward-facing face the EMR coupler 64. EMR coupler 64 is of similar construction as EMR coupler 62, consisting of groove 70 with antenna 71. Electrically, the antenna 71 is connected to the interior of the repeater box 50 via feed-throughs 172 (not shown in FIG. 7) located below groove 70 close to capacitor blocks 74.

As mentioned above, within the repeater box 50 and sealed from the outside are located numerous cylindrically shaped cavities 52 that may house electronic circuits and batteries. However, most repeater boxes are passive devices with simple, straight-through wiring between EMR couplers 64 (mounted on the outward-looking repeater box face) and 63 (mounted on the inward-looking repeater box face; not shown in FIG. 7). Also not shown in FIG. 7 is a wire channel that is located under the EMR coupler and that connects the cavities 52 for the purpose of signal and power wire routing. EMR coupler 63, which is located on the opposite face of the repeater box 50 and which is not shown in FIG. 7, is constructed in the same fashion as EMR coupler 64.

Figure 8:
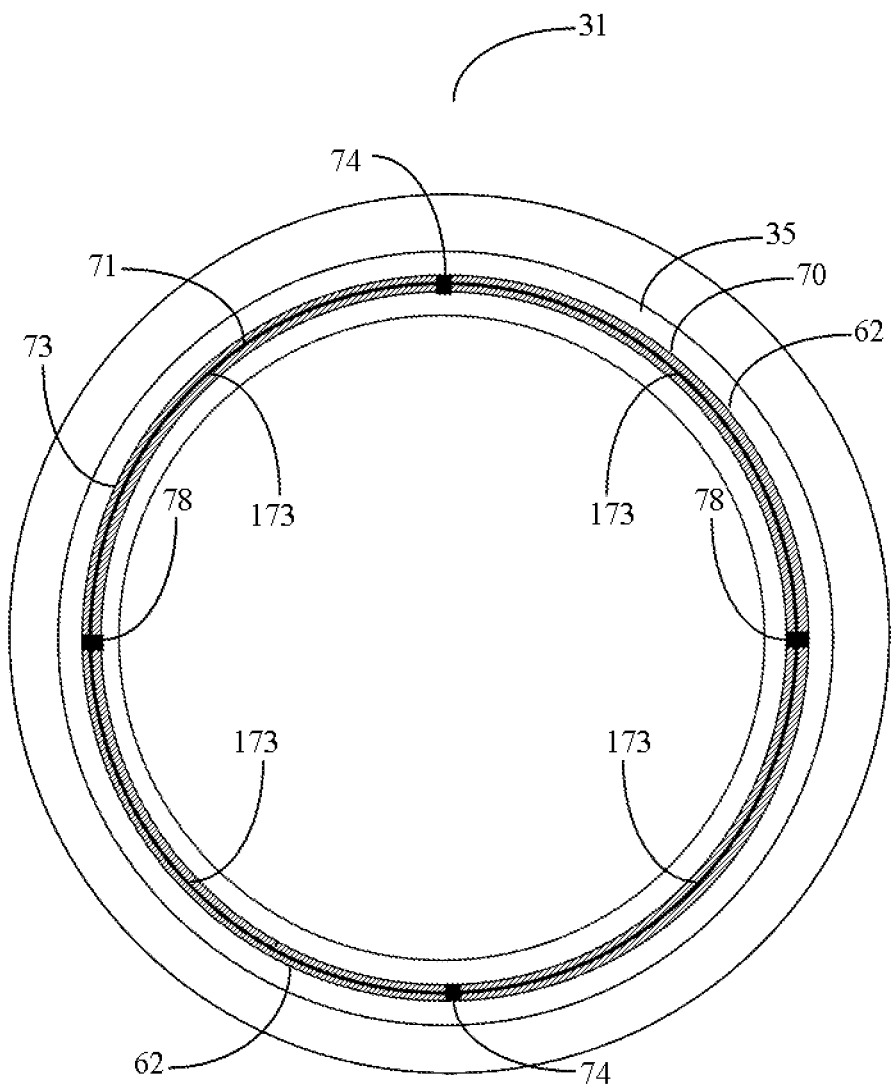
FIG. 8 is the view labeled "C" in FIGS. 3 and 4, with the repeater box removed and showing the box back wall.

FIG. 8 shows the EMR coupler 61 that is housed in the back wall of the box 31. This EMR coupler 61 is constructed in similar fashion as the pin EMR coupler 62.

It is also possible to install the present data transmission system in pipe joints without the use of passive repeaters boxes as all EMR couplers 61, 62, 63, 64 are compatible with each other. For example, it is possible to directly interface the pin EMR coupler 62 with the box EMR coupler 61. In these pipe joints, the box 31 is not back bored and retains its original double-shouldered dimensions. An advantage of this "repeater-less" option is an increase in signal strength through a series of pipe joints, which in turn enables increased distances between active repeaters. The main disadvantage of using fewer or no passive repeaters is the added logistical requirement of separately maintaining and keeping track of back bored pipe joints and non-back bored pipe joints.

Figure 9:
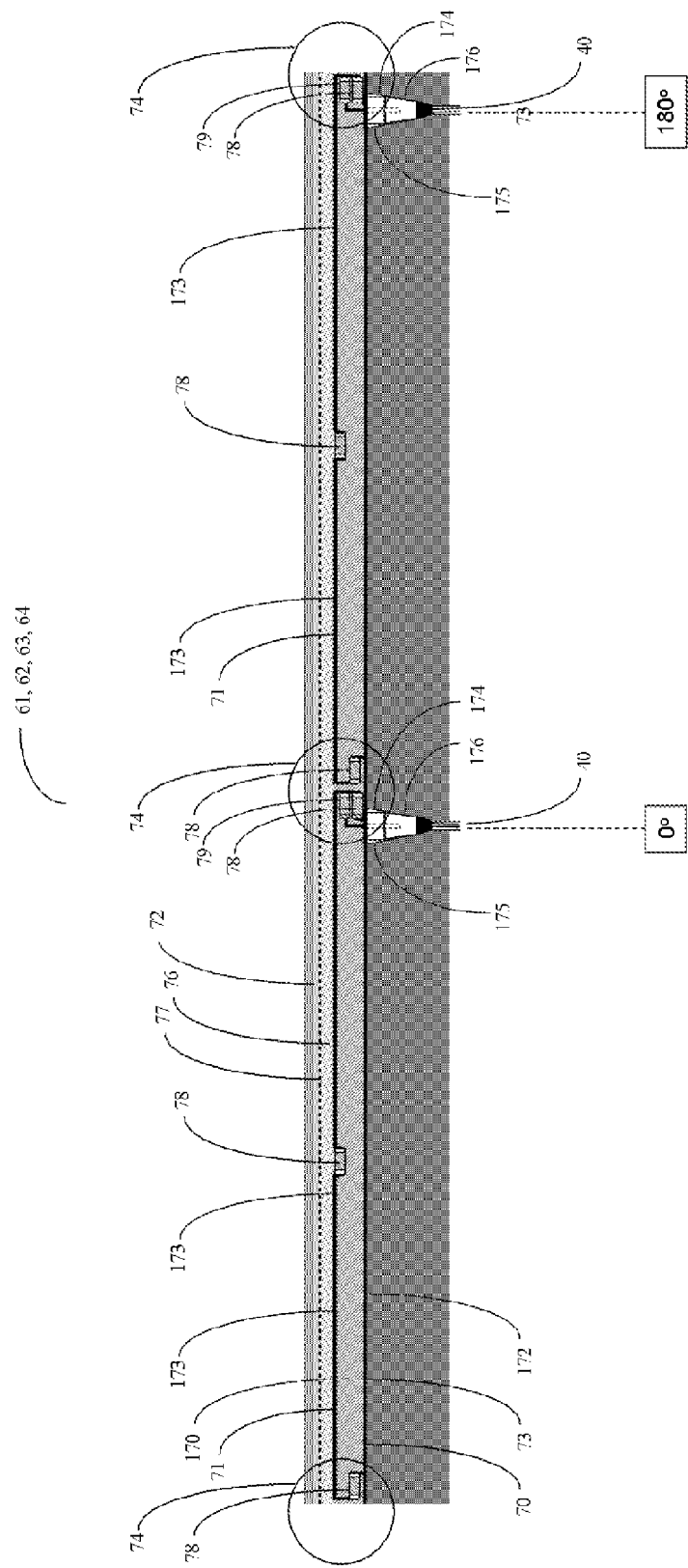
FIG. 9 is a conceptual cross-sectional flattened view showing the construction of an EMR coupler.

FIG. 9 shows the construction of the EMR couplers 61, 62, 63 and 64. FIG. 9 is a conceptual, flattened cross sectional view through an EMR coupler spanning a 360° view angle. The groove 70, which is about 4-5 mm deep, houses a dielectric laminate stack 170, which is about 2-3 mm high. The dielectric 170 is preferably manufactured as fiberglass-reinforced PTFE laminate or from dielectric ceramic. Suitable laminate products are available from Arlon, Microwave Materials Division, Rancho Cucamonga, Calif. 91730. All circuit traces are preferably realized as copper traces with a minimum thickness of at least 0.001" (25.4 micron) and surface-finished by silver-immersion. The antenna 71 is a 1-2 mm wide microstrip trace located on the outward-facing side, while a ground plane 172 is located on the inward-facing side of the dielectric 170. The dielectric 170 also houses miniature radiofrequency connectors 174 and various surface-mount capacitors 78 and 79. Suitable highly-stable, high-temperature surface-mount ceramic capacitors based on "COG"-type dielectric material are available from NOVACAP, Valencia, Calif. 91355. The radiofrequency (RF) connectors 174 are connected to other RF connectors 176 of opposite gender that terminate the coaxial cables 40. The conical RF connectors 176 are seated in conical recesses 175. This arrangement exerts a tensional pre-load on the coaxial cables 40, which keeps the cables taut under operating conditions. Suitable high-temperature subminiature radiofrequency connectors such as SMB or MCX connectors are available from Amphenol R F, Danbury, Conn. 06810. All electrical connections should be either welded or soldered using lead-free high-temperature high-conductivity solder.

The purpose of capacitors 78 is to match the electrical length of antenna 71 to the length of groove 70. The length of groove 70 is governed by the circumference of the connection shoulder the EMR coupler is embedded in. If the physical length of groove 70 is equal to or is equal to a multiple of the electrical length of antenna 71, at specific frequencies standing-wave pattern emerge on antenna 71 that can store comparatively large amounts of electromagnetic energy. This store of electromagnetic energy contained in a non-magnetic dielectric medium such air, or in this case, dielectric potting material, is the basis for electromagnetic resonance (EMR) coupling. If two grooves 70 are joined to form a closed or semi-closed cavity, this cavity is filled with high-frequency electromagnetic energy, of which a portion is coupled into any tuned, resonating circuit located within the cavity. The standing waveform is characterized by voltage crests at the voltage blocks 74 and by voltage discontinuities at the series capacitors 78. At the points of voltage crests, power may be capacitively coupled in and out of the resonating system. The current obeys a continuity relationship, flowing continuously around the loop formed by antenna 71, with an opposing current flowing in the opposite direction in the ground plane 172. By choosing the number and values of voltage discontinuities by means of tuning capacitors 78, it is possible to arrange the standing wave pattern such as an integer multiple of the wavelength fits into the physical length of groove 70. Being in resonance, the antenna 71 receives and regenerates all signals that are fed into the cavity by means of connectors 174 and 176, be it from the same pipe joint or from the adjacent pipe joint.

The matching capacitors 79 couple a portion of the energy stored in the cavity and the antennas 71 into and out from the transmission lines 40. The values of capacitors 79 therefore are both functions of the operating frequency and of the characteristic impedance of the transmission lines 40.

An optional Faraday shield 77 may be installed about 1 mm above the antenna 71 by floating the shield 77 in the encasing material 76. The purpose of the Faraday shield 77 is the introduction of a null value for the E-field vector near the surface of the EMR coupler. The shield 77 consists of radially oriented wires—shown in their cross section, i.e. as dots, in FIG. 9—that cross the antennas at a 90°-angle and that are in connection with the pipe metal at the inner diameter of groove 70. At the outer diameter, the shield wires are left electrically unconnected to inhibit eddy current loops.

Since the inner shoulders of double-shouldered rotary connections are not fluid seals, a gap may exist between proximate EMR couplers, admitting drilling fluids into the space between proximate EMR couplers. These drilling fluids are substantially non-magnetic, i.e. the non-magnetic groove 70 is already matched to the drilling fluids, but the drilling fluids may or may not be electrically conductive, in the former case the fluids being essentially at ground potential. The Faraday shield 77 further improves the already good coupling characteristics of the EMR couplers by forcing a boundary condition on the electromagnetic field that matches both electrically conductive and electrically insulating drilling fluids.

The electromagnetic characteristics of an EMR coupler pair in conjunction with conductive or non-conductive drilling fluids stands in contrast to the characteristics of the Hall WPS couplers. The Hall couplers employ magnetically conductive, electrically insulating ("MCEI") core materials, i.e. magnetic materials such as ferrites, which are a particularly poor match for the substantially non-magnetic drilling fluids that may be forced by the downhole fluid pressure into a gap between the couplers. During field operations, such small gaps are practically unavoidable, since it is not practical to perfectly clean the mating surfaces from the fluids and solids that make up commercial drilling muds. The significant impedance mismatch causes a disruption in the electromagnetic field, which is reflected back into the rest of the circuit as a variable and uncontrollable reactance. For example, assuming ferrite material with a relative magnetic permeability of 100, a non-magnetic gap of only 0.5 mm mimics an additional magnetic path length of 50 mm. This represents about a doubling of the non-gapped magnetic path length and a change in inductance L by a factor of about 2. This instability is tolerable as long as the variable inductance L is not part of an L-C resonance circuit, whose resonance frequency would vary with the inverse square root of the variable inductance. As such, the resonance frequency would be very sensitive to temperature, pressure and the size and shape of the gap between the MCEI couplers and would randomly differ between couplers arranged in series. As a result, the impedance presented to the attached cables would change dramatically as a function of environmental parameters at and around the resonance frequency or frequencies, resulting in random signal reflections and random additive and destructive waveform interference. In contrast, gapping a non-magnetic EMR coupler pair has no material effect on the resonance frequency of each antenna. The relatively simple, solid-state and hermetically sealed construction of each EMR coupler assures that the resonance frequency is controlled by design and is uniform across all EMR couplers.

The entire EMR coupler circuitry consisting of the laminate stack 170, components 71, 78, 79 and connectors 174 and 176 is encased in a high-performance polymer 76 suitable for downhole use such as epoxy-based STYCAST potting material, made by Emerson & Cuming, Billerica, Mass., or polyaryletheretherketone ("PEEK"). A suitable supplier of PEEK material is Greene Tweed & Co Inc, Houston, Tex. 77032. Since EMR coupling is most effective at high frequencies, the potting material should be of high dielectric quality with low dielectric losses in the HF-to-UHF frequency range.

Resonant coupling in general works best in electrically insulating, non-magnetic media such as air, ceramics, epoxies or high-performance plastics. The potting material should approximate such a condition by using a non-magnetic dielectric material with a relative dielectric constant of preferably between 1 and 5 and a relative magnetic permeability close to 1. Magnetic materials, however, such as those essential for the operation of the Hall WPS and exhibiting relative magnetic permeabilities between about 10 to several 1,000, are not permissible. At frequencies below the preferred HF-to-UHF range, e.g. at the operating frequencies of the Hall WPS, copper conduction losses suppress the EMR effect. In the preferred HF-to-UHF frequency range, and in particular at frequencies above 10 MHz, the presence of magnetic material would introduce high hysteresis losses, which again suppress the EMR effect. Thus, the non-magnetic material in the electromagnetic coupler enables high-frequency operation above 10 MHz that would not be possible if magnetic material were used as in the prior art.

The hard epoxy encapsulant 76 is preferably topped with a resilient, yet elastic layer 72 consisting of a downhole-suitable elastomer. This layer, with a thickness of about 1 mm, insulates the EMR coupler circuitry from shock impacts to the pin face or the box back wall. Suitable elastomer products are available from DuPont Performance Elastomers, Wilmington, Del. 19809, such as "Viton Extreme". Viton, being a fluoroelastomer, has a relatively high relative dielectric constant of around 9-10. The Faraday shield 77 significantly reduces the E-field component within the elastic layer and therefore such high relative dielectric constant values have no negative effects such as detuning on the EMR coupler. The exposed surface of elastomer 72 may be coated with a layer of PTFE fluoropolymer resin. A suitable PTFE product is "Teflon", also made by DuPont, Wilmington, Del. 19809. PTFE provides a smooth, finished surface that is made flush with the face of the host component (tool joint pin, box back wall or repeater box face) and, due to its self-lubricating properties, can withstand many make-up/break-out cycles. Alternatively, an elastomeric seal may be pre-produced, covered on the outer side with a PTFE layer and having printed on its inner side the pattern of the Faraday shield 77 by means of silver-loaded epoxy. This pre-fabricated seal can be pressed into the epoxy polymer 76 during the curing stage of such polymer 76.

Data and information are modulated onto a carrier signal with a frequency that causes all EMR couplers in the signal path to simultaneously resonate and to exchange energy with each other. The chain of EMR couplers efficiently passes signals in a window several MHz wide around the resonance frequency and greatly attenuates signals outside the window. This chain also selects very efficiently against defective signal transmission components because a defective element is characterized by having either no EMR or having a resonance that falls outside the passband window or having a resonance of poor quality as expressed by a low Q factor. Such defective elements are unable to achieve EMR at the operating frequency, be it because of reflections on the transmission lines 40 due to short circuits or broken conductors, or because of defective capacitors 78 or 79, or because of broken or short-circuited wire segments 173. Without resonance at the operation frequency, defective transmission elements do not exhibit EMR coupling and can no longer materially exchange energy with the rest of the system. As long as parallel, redundant signal transmission elements are available in the form of additional wire segments 173 with circuits 74 and 78 and/or transmission lines 40, the signal transmission and energy exchange mechanism automatically moves to the remaining, functioning elements. In the presence of circuit defects, the standing-wave pattern on antenna 71 may transition from the normal, integer-wavelength mode to alternate, fractional-integer modes. In the simplest case of a regular mode of a single wavelength around groove 70's circumference, one alternate mode is a half-wavelength, standing-wave resonance on one-half of antenna 71. The continuity requirement for the current is fulfilled by displacement currents through capacitors 78 to the ground plane 172. Analysis of the circuit shows that the new resonance occurs at the same frequency as the full-integer resonance, which is essential for the uninterrupted operation of the entire system.

Figure 10:
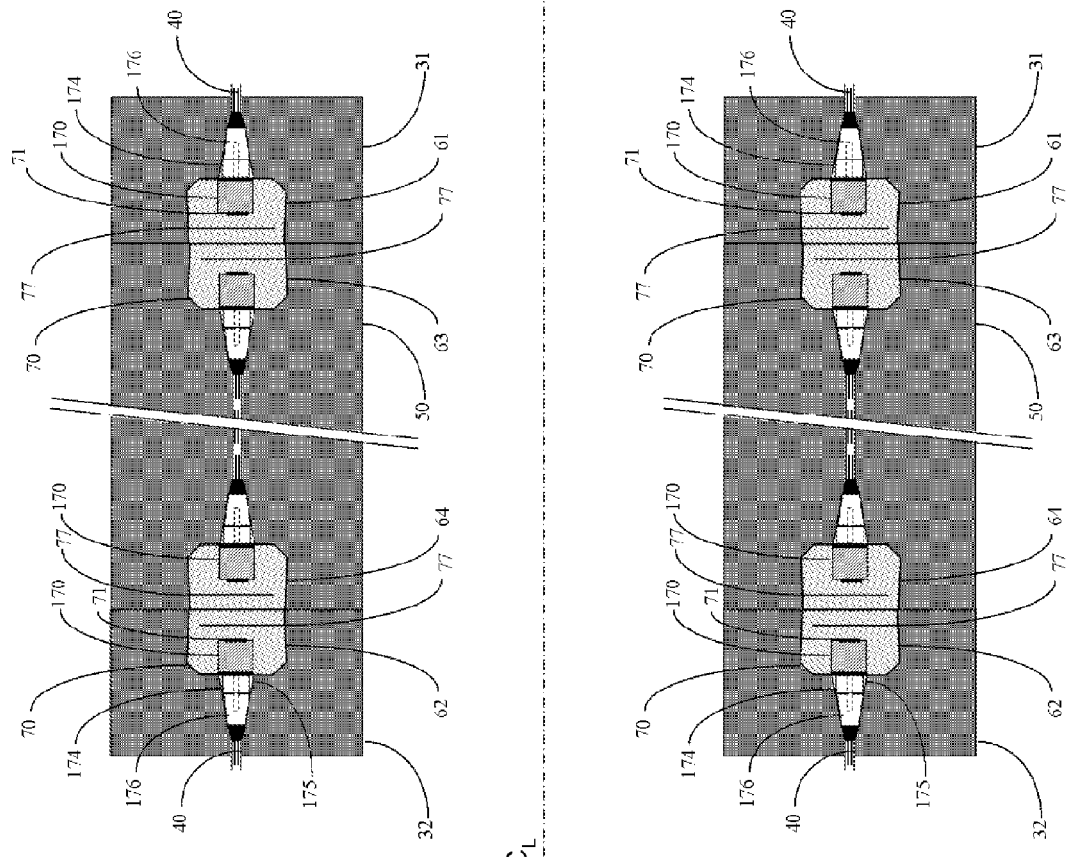
FIG. 10 is a conceptual cross-sectional view of a chain of EMR couplers that are embedded in the pin, in the repeater boxes, and in the box back wall.

FIG. 10 shows a conceptual cross section through a series of EMR couplers 62, 64, 63 and 61. Signals and/or high-frequency power arrive and depart via coaxial cables 40 and are passed between EMR couplers through resonance coupling. Shown are, from left to right, the pin-mounted EMR coupler 62, the outward-facing repeater box EMR coupler 64, connected by wire to the inward-facing repeater box EMR coupler 63, and the box-mounted EMR coupler 61. The groove 70 has a trapezoidal cross-section, i.e. the groove is slightly back-cut to hold captive the potting material 76. As discussed, the groove 70 is coated with a flame-spray applied highly-conductive layer 73. Opposing grooves 70 form closed cavities of approximately rectangular cross sections, in which the resonance coupling takes place. All circuit elements located within that cavity and tuned to the operating frequency are forced to resonate at the same frequency and coherently with respect to each other. In a normally functioning system, the transmission lines 40 carry fully redundant, more or less identical copies of the signals that are applied to the EMR couplers. In a partially defective system, the elements exhibiting abnormal resonance frequencies and/or abnormal characteristic impedances are decoupled from the energy transfer taking place in the closed cavities.

Figure 11:
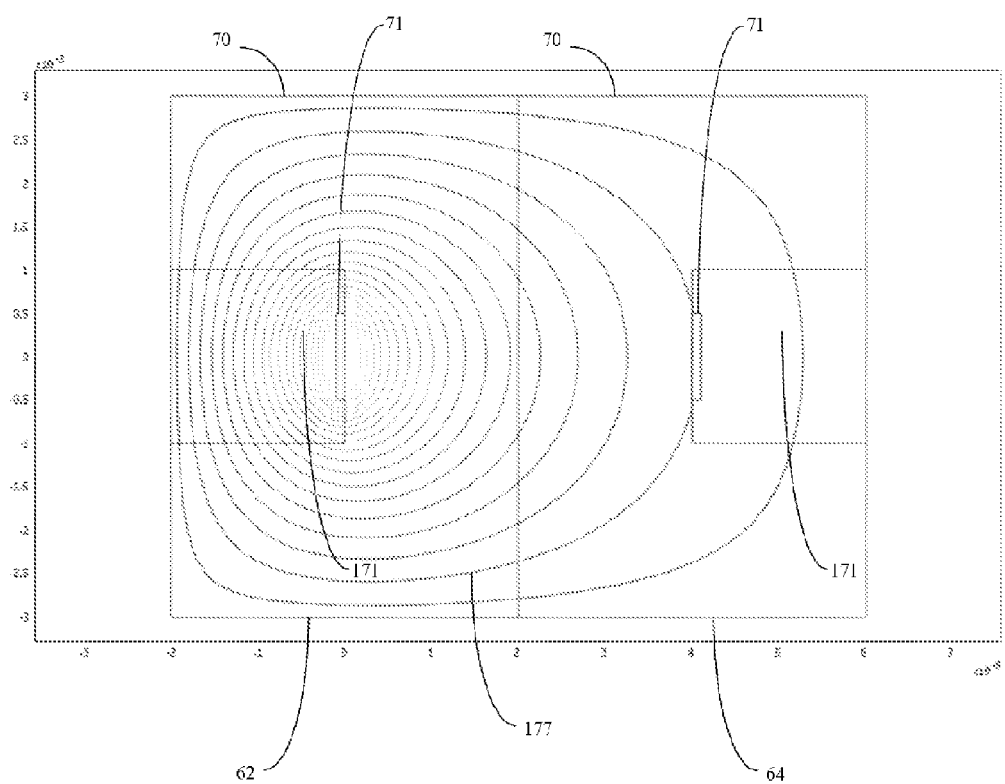
FIG. 11 shows the result of numerical modeling of two mated EMR couplers.

FIG. 11 shows a numerical modeling result corresponding to the arrangement of FIG. 10. A mated pair of EMR couplers has been modeled by COMSOL Multiphysics, COMSOL Inc., Burlington, Mass. 01803. FIG. 11 shows lines of constant magnetic potential 177, such potential generated by the left EMR coupler 62 and generating an electromagnetic field within the closed cavity formed by adjacent grooves 70. In the model, each groove 70 is 4 mm deep and 6 mm wide, resulting in a cavity with 8 mm×6 mm cross-sectional area. The antennas 71 are 1 mm wide printed traces on a 2-mm high and 2-mm wide PTFE-based substrate 171. The communicating antennas 71 are about 4 mm apart. The calculated off-resonance coupling factor k between antennas 71 is about 0.1.

An off-resonance coupling factor k of about 0.1-0.2 is sufficiently small to satisfy the weak coupling condition necessary for redundant signal coupling operation. The impedance of non-resonating, i.e. presumably defective circuits is reflected back into the operational circuits with a factor of $k^2$, which is only on the order of 0.01. Thus, complete shorts and/or discontinuities disabling portions of the circuit do not materially affect the remaining, functioning portions of the circuit. Another advantage of resonance-coupled circuits is a broad resonance window that exceeds the bandwidth of a single, high-Q antenna. Therefore, the advantage of resonant coupling using high-Q resonators in accordance with the invention is not penalized by a narrow bandwidth. Typically, at operating frequencies of around 100 MHz and Q factors of up to 100, flat transmission windows of around 10 MHz width can be achieved. Thus, a data transmission system operating at about 1 Mb/s and utilizing a bandwidth of about 1 MHz, can operate within +/−5% of the center frequency of the transmission window, a feature that greatly contributes to the stability and robustness of the system. In particular, it will be appreciated that the high-frequency operation enables high-Q resonance ("EMR"). EMR, in turn, enables the construction of couplers that are nominally, i.e. off-resonance, only weakly coupled, while exhibiting strong power and/or signal transfer on resonance. This effect can be exploited for the construction of a robust transmission system containing parallel, redundant transmission segments. Electrical and/or mechanical damage to any such segment disables EMR for that segment, i.e. the defective segment becomes effectively decoupled from the rest of the system as the defective coupler segment or coupler segment attached to a failed cable will not resonate at high Q at the right frequency. The defective portion of the system is thus only weakly coupled to the rest of the system and is practically decoupled. A redundant segment in the rest of the system automatically takes over the function of the failed segment. The power and signals will flow exclusively over the redundant path. This process is automatic and requires no intervention or explicit switching.

Figure 21:
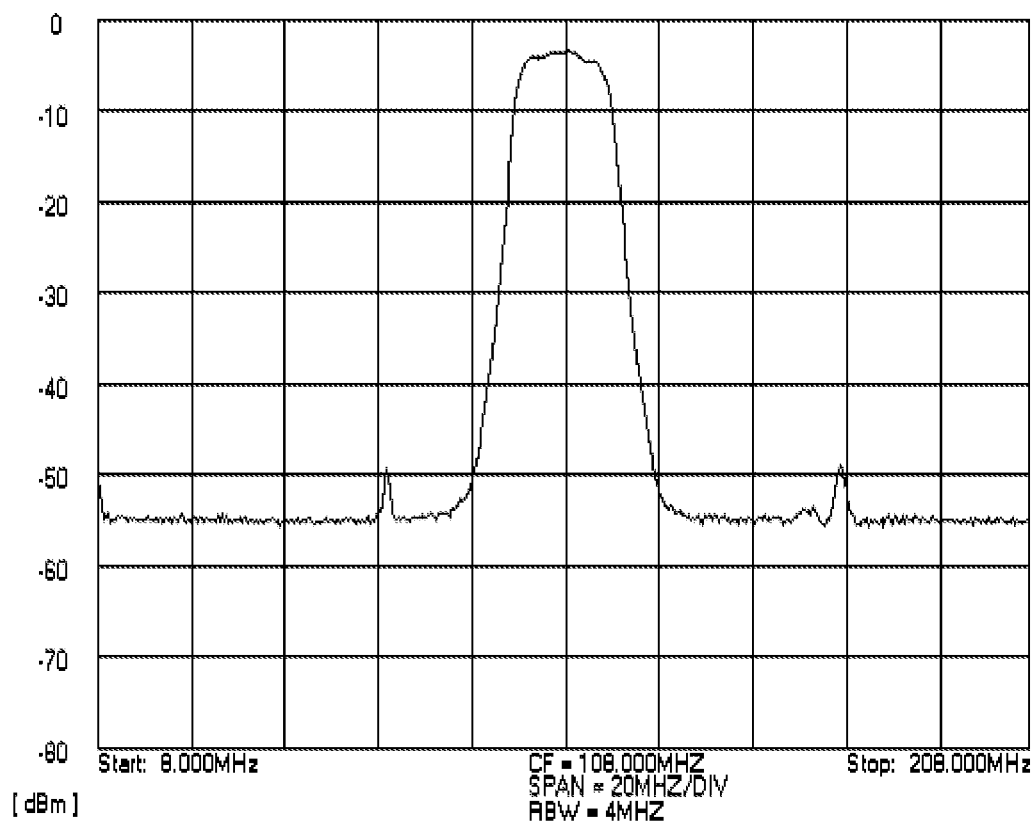
FIG. 21 is a spectrum analyzer screenshot showing the measured transmission spectrum of a chain of six EMR couplers.

FIG. 21 shows the measured transmission spectrum of a string of six EMR couplers in series. The center frequency of the passband window is 108 MHz and the available bandwidth is about 14 MHz. The steep fall-off towards frequencies below and above the passband is evident. The out-of-band "blips" are spurious resonances introduced by the finite lengths of the connecting cable segments. Such spurious resonances occur in any wired-pipe system due to the quasi-periodicity of the circuit topology that tend to disperse as pipe segments of different lengths are assembled together. The strong attenuation against out-of-band frequencies hardens the system against electromagnetic interference from the outside and also very effectively disables malfunctioning circuit elements that exhibit abnormal resonance behavior. The signal and power attenuation within the passband that is attributable to the chain of EMR couplers is about −4 dB, with each pair of EMR couplers contributing about −1 dB and the total cabling contributing also about −1 dB. The loss per pair of −1 dB indicates that each pair operates at 89% transmission efficiency in this particular case.

The combination of high-frequency, high-efficiency signal and power transfer in a wide frequency band is considered unattainable in the present literature of downhole communication systems. For example, the recent U.S. Pat. No. 7,362,235 to Norman states that in high-frequency tuned signal transmission systems the transmissive frequency range is greatly diminished, rendering such high-frequency systems unsuitable for downhole telemetry purposes. In contrast, the present system not only transmits signals and data robustly and efficiently, but also transmits high-frequency power that can be converted into a DC power supply voltage where such a supply may be required. In the example shown in FIG. 21, about 40% of the high-frequency power fed into the chain of EMR couplers at one end can be harvested at the receiving end. Given that the high-frequency power available at the surface is hundreds of watts and that downhole circuitry can be run effectively from as little as 1 mW, a fairly long chain of EMR couplers can be assembled and can still be useful as a power delivery conduit.

As will be further elaborated on in the section "EMR COUPLER DESIGN AND OPERATING FREQUENCY", under actual field conditions, the attenuation associated with a single 31-ft. pipe joint containing a single passive repeater is about −6 dB. At a nominal transmitter output power level of 1 mW (0 dBm) and a minimum usable receiver input level of about −80 dBm, repeaters can communicate with each other over distances of up to about 372 ft. (113 m), equivalent to 12 pipe joints or 4 pipe joint stands. Thus, the minimum number of active repeaters in a 30,000-ft drill string is about 80. For redundancy reasons, at least twice as many active repeaters should be installed as minimally necessary. Logistically and for compatibility with automated rig equipment, it is desirable to pre-assemble identical drill joint stands, i.e. adding one active repeater box and two passive repeater boxes to each stand. The number of active repeater boxes in the example 30,000-ft. drill string is 323 and the number of passive repeater boxes is 646. Thus, the number of active repeaters is four times the minimum number necessary, creating a triple-redundancy active repeater network.

The large signal margin can be exploited in several ways. First, repeaters can communicate with each other bridging over several defective repeaters and can overcome a large number of various and simultaneous failure occurrences. Secondly, the transmit power level and the receiver supply current can be lowered to achieve sub-milliwatt power consumption per repeater for extended battery lifetimes and/or for self-powered methods as discussed below. Thirdly, the system lends itself to the use of lossy transmission line systems such as buried thin-gauge wires.

In an alternate implementation, the transmission lines 40 are implemented as thin-gauge wires buried in the fusion-bonded epoxy (FBE) coating of the pipe's interior bore. The method of using buried wires and electrodes is explained in detail in Int. Pat. Appl. PCT/US 09/44949, filed May 22, 2009. The contents of this application are hereby incorporated by reference in their entirety. An advantage of using buried wires as transmission lines is the small incremental cost associated with adding additional parallel wires. The buried wires are routed as enamel-coated, but otherwise unhardened wires through the tubular section 32 as part of the FBE coating. The connection between the unhardened wire section and the EMR couplers tunnels through the tool joints from the interior bore to the pin face or to the box back wall. This electrical connection is preferably implemented as "hard-line" coaxial section that is inserted into the bored wire channel and is potted in place and hermetically sealed with materials such as epoxy-based STYCAST or PEEK.

As discussed, the "longitudinal redundancy" implemented by the bridging of non-operative active repeater units, combines with the "lateral redundancy" provided by multiple, parallel transmission lines 40. As shown below, both active and passive repeaters randomize transmission pathways between transmission segments such that the resulting network is a complex, quasi-random web of interleaved transmission paths. During normal operations, these paths carry information that is redundant both in a spatial sense (in the transversal/parallel direction) as well as temporal (in the longitudinal/series direction). In case of a failure, the network configures itself either passively by redistribution of the signal paths or actively by following the active repeater's algorithm, which will be discussed below.

The repeater boxes 50 do not have fixed angular positions within the pipe joint box 33; indeed, it is preferable that that angular orientation of all repeater boxes 50 and therefore of EMR couplers 63 and 64 is randomized. In addition, the angular orientation of EMR couplers 61 and 62 is not defined. Again, it is preferable that the EMR couplers 61 and 62 assume random orientations with respect to each other and with respect to repeater box EMR couplers 63 and 64. The result is a network of semi-random signal paths, with the repeater boxes 50 providing cross-over and mixing functionality between the transmission lines 40. This built-in cross-over and mixing functionality is essential for the automatic bypassing of failure points ("faults") when the radiation pattern of one or more EMR couplers may have become lopsided due to a failure in one or more branches of the circuit. The semi-randomness of the signal path restores the symmetry between transmission lines 40 and the symmetry in the radiation patterns of the EMR couplers in both directions within a few connections away from the failure point. This symmetry also allows EMR couplers of different construction to seamlessly interface with each other. In particular, at the signal injection and reception points at both ends of the data transmission chain it is advantageous to convert from dual-cable transmission to single-cable transmission.

Figure 12:
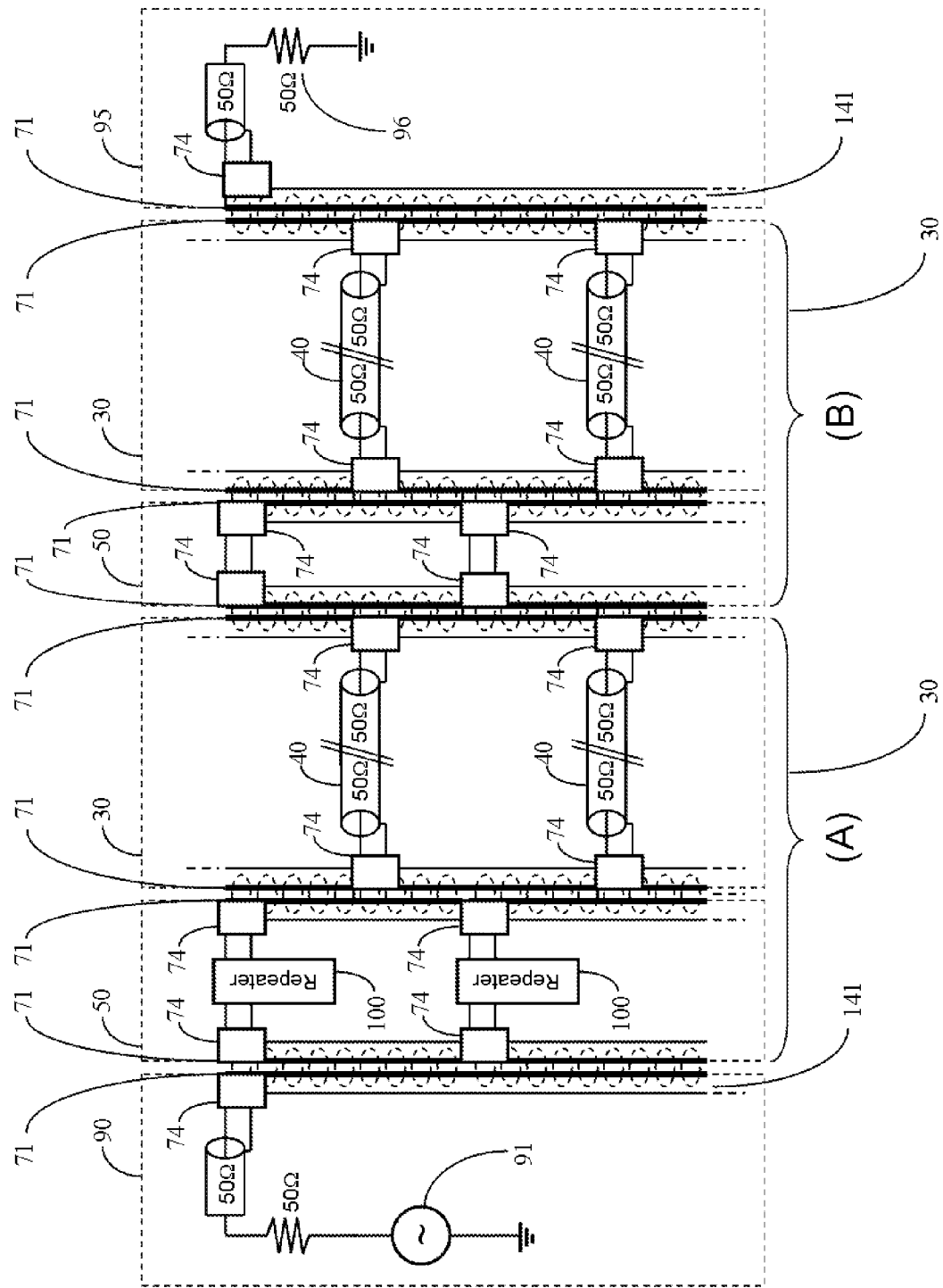
FIG. 12 is an illustration of the various signal paths formed by two joined pipe joints containing an active repeater box and a passive repeater box.

FIG. 12 presents the principal signal paths through an exemplary assembly consisting of a signal injection device 90, a pipe joint 30 ("A") instrumented with an active repeater box 50, another pipe joint 30 ("B") instrumented with a passive repeater box 50, and a signal detection device 95. For clarity, only one capacitor block 74 per wire segment 173 is shown and additional tuning capacitors 78 have been omitted. Typically, the surface interface ("communications sub") and the downhole interface sub ("BHA sub") will contain both signal injection devices 90 and signal detection circuits 95, enabling bidirectional data transfer. The EMR couplers 141 attached to the injection and detection devices interface to 50-ohm signal sources 91 and signal sinks 96, respectively. In the example shown in FIG. 12, the injected signal is picked up by an active repeater box 50 that contains two repeater circuits 100. The repeater circuits 100 detect incoming message packets, check the message's validity and, if certain conditions are fulfilled, forward the message packets in amplified and restored form in both directions. The left-to-right-traveling signal traverses a pipe joint 30, a passive repeater box 50, another pipe joint 30 and finally is received by the detection device 95. In an actual implementation, the number of pipe joints B with passive repeater boxes outnumbers the pipe joints A with active repeater boxes.

Figure 13:
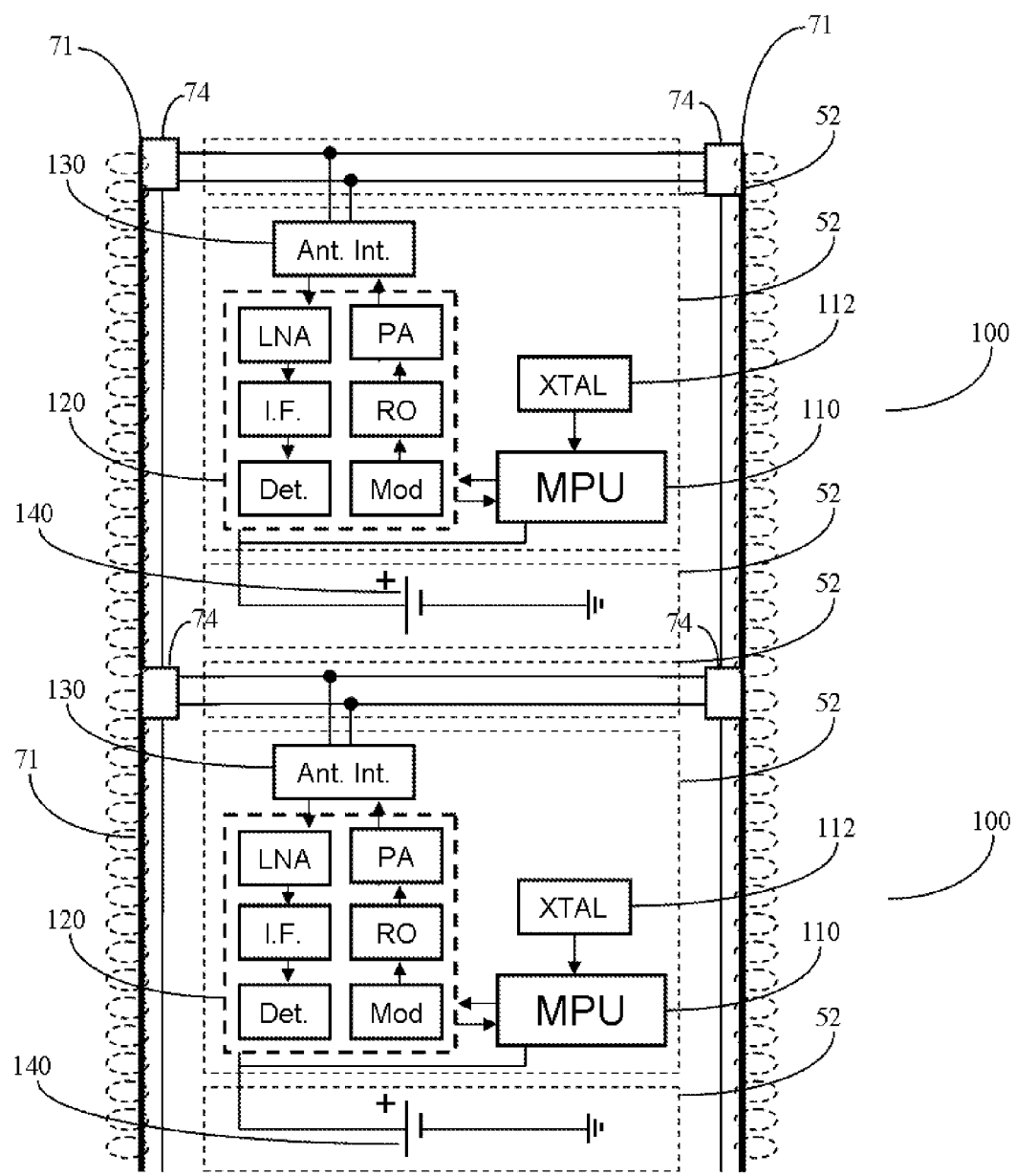
FIG. 13 is a conceptual circuit block diagram of the various functional blocks within an active repeater box.

FIG. 13 shows diagrammatically and simplified the circuitry inside an active repeater box 50. Two repeaters 100 are housed in cavities 52 and are attached to antennas 71 with tuning and coupling capacitors 78 and 79. The two repeaters are independent of each other and each repeater 100 can function without the other repeater. In addition, the circuit, and in particular the antenna interfaces ("Ant. Int.") 130 are constructed such that in the event of a hardware electronics failure, the antennas 71 corresponding to the failed repeater are electrically passively connected to each other, enabling non-amplified and non-buffered communication between the two faces of the repeater box. A repeater consists of the main blocks: a microprocessor unit "MPU" 110, a clock source "XTAL" 112, an RF (radiofrequency) front end 120, an antenna interface 130 and one or more lithium batteries 140. The cavities are dimensioned to house sub-AAA primary lithium-thionyl-chloride cells, e.g., #10-25-150 LR, available from Electrochem, Clarence, N.Y. For the electronics portion, the following components may be used: MPU 110: PIC24F16KA102, available from Microchip Technology, Inc., Chandler, Ariz. 85224-6199; RF front end 120: TH 71221, available from Melexis Microelectronic Systems, B-8900 Ieper, Belgium; and XTAL 112: ABM3B SMD Crystal, available from Abracon Corp., Rancho Santa Margarita, Calif. 92688. These chips measure 5 mm×5 mm (MPU and RF chip, both in QFN packages) and 5 mm×3 mm (XTAL).

The TH 71221 chip performs the functions of modulation ("Mod."), reference oscillator ("RO"), power amplifier ("PA"), low-noise amplifier ("LNA"), intermediate-frequency gain stage ("I.F.") and detection ("Det."). The antenna interface performs impedance matching and switches between the transmit path from the PA to the antennas and the receive path from the antennas to the LNA. The output power is set to about 0 dBm (1 mW) into each direction (+3 dBm total). The usable input signal level is between 0 dBm and −90 dBm. The available bandwidth of the TH 71221 is about 200 kHz and the burst data throughput is about 200 kb/s in ASK and FSK modulation modes. One repeater circuit consumes about 12 mA while receiving and about 24 mA while transmitting from a lithium cell with a nominal voltage of 3.6 V. At an operating temperature of 150° C., a single sub-AAA cell supplies about 400 mAh over several hundred hours. Due to the self-discharge current at high temperatures, adding another sub-AAA cell brings the total amount of charge available to about 600 mAh.

In order to receive and to forward a single message packet of, e.g., 250 bytes, a repeater need to be in receive mode for about 10 ms, in transmit mode for the next 10 ms and in a quiescent state for another 10 ms, assuming a burst modulation rate of 200 kb/s. The maximum raw data throughput at this burst modulation rate is 33 packets per second or 66 kb/s. This limit is imposed by the bandwidth of the TH 71221 chip and not by the data transmission system per se. The latency time per active repeater is about 10 ms, i.e. the total latency time through a 30,000-ft. (10 km) string is on the order of three seconds, assuming 322 active repeaters.

Assuming the maximum data transmission rate of 66 kb/s and alternating operation of the two repeaters per repeater box, one repeater receives for 10 ms and transmits for 10 ms every 60 ms. The resultant supply current draw is 12 mA/6+ 24 mA/6=6 mA, resulting in an operating time of about 100 hours when running on two primary cells per repeater. For most of a well, however, the high data rate is unnecessary and a much reduced rate would be sufficient. In the present data transmission system, the minimum data rate is set to one 250-byte message every second, i.e. 2 kb/s. Using the power saving techniques described below, the average current draw per repeater may be reduced to about 0.1 mA, resulting in run times essentially only limited by the self-discharge rates of the lithium cells.

Figure 14:
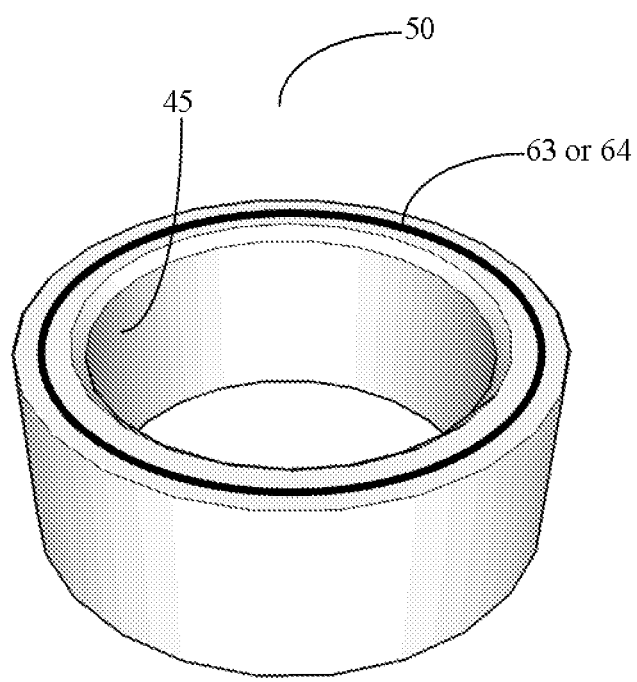
FIG. 14 is a perspective view of a repeater box.

FIG. 14 shows the outside view of an assembled repeater box 50. The hermetically sealed EMR coupler 63 or 64 is visible on the top face. Active and passive repeater boxes 50 are preferably differentiated by color-coded visible front faces, ensuring that active repeaters are inserted at appropriate intervals. Optionally, the interior bore wall may be coated with FBE pipe coating 45. The entire repeater box 50 is preferably hermetically sealed.

In operation, the repeater box 50 is held captive between a tool joint pin and the back wall of a tool joint box. Mechanically, the repeater box transmits a compression load between pin and box and provides a well-defined stop for the rotary connection, thereby preventing overtorquing the connection during make-up and/or under torsional stress downhole.

In storage, care must be taken that repeater boxes 50 located in open tool joint boxes 31 do not relocate. Such self-locking action may be accomplished by various, well-known structural details. Machining the inner diameter of tool joint box 31 and the outer diameter of the repeater box 50 slightly conical achieves self-locking through frictional forces between the surfaces. Alternatively, retention rings may be used that engage with grooves located both in the box and on the repeater. Preferably, the pin rotation action during break-out forces the retention mechanism to engage, i.e. to lock the repeater box in place. The opposite rotational sense occurs during make-up, in which case no retention is needed as the pin holds down the repeater box. Manual repeater box removal comprises rotating the repeater box in the make-up direction, thereby releasing the locking mechanism, and simultaneously lifting the repeater box out of the tool joint box. A new repeater box is inserted by pressing down on it and engaging the lock mechanism by rotating the repeater box in the break-out direction.

The logistical task of distributing active repeater boxes throughout the system is simplified by monitoring the received signal strength at the surface terminal station. Any time the surface station sees the incoming signal from the closest repeater or repeaters to approach or fall below a predetermined threshold, the system issues a request for a pipe joint or for a pipe stand containing an active repeater. That way, highly heterogeneous telemetry strings consisting of active and passive repeater boxes, long and short pipe joints, WPS pipe joints and/or WPS specialty components may be build up without specific knowledge of the attenuation factor in each such drill pipe element.

The mechanical dimensions of the repeater box 50 and the amount of backboring are chosen to match the dimensions of commercial double-shoulder connections. Furthermore, the pin of a double-jointed downhole component fits the pipe joint box 31. Such a connection achieves its full mechanical strength if an active or passive repeater box 50 is held captive between the standard pin and the box back wall. Likewise, a pin pipe joint 33 according to the present invention fits the box of a double-shouldered downhole component.

Figure 15:
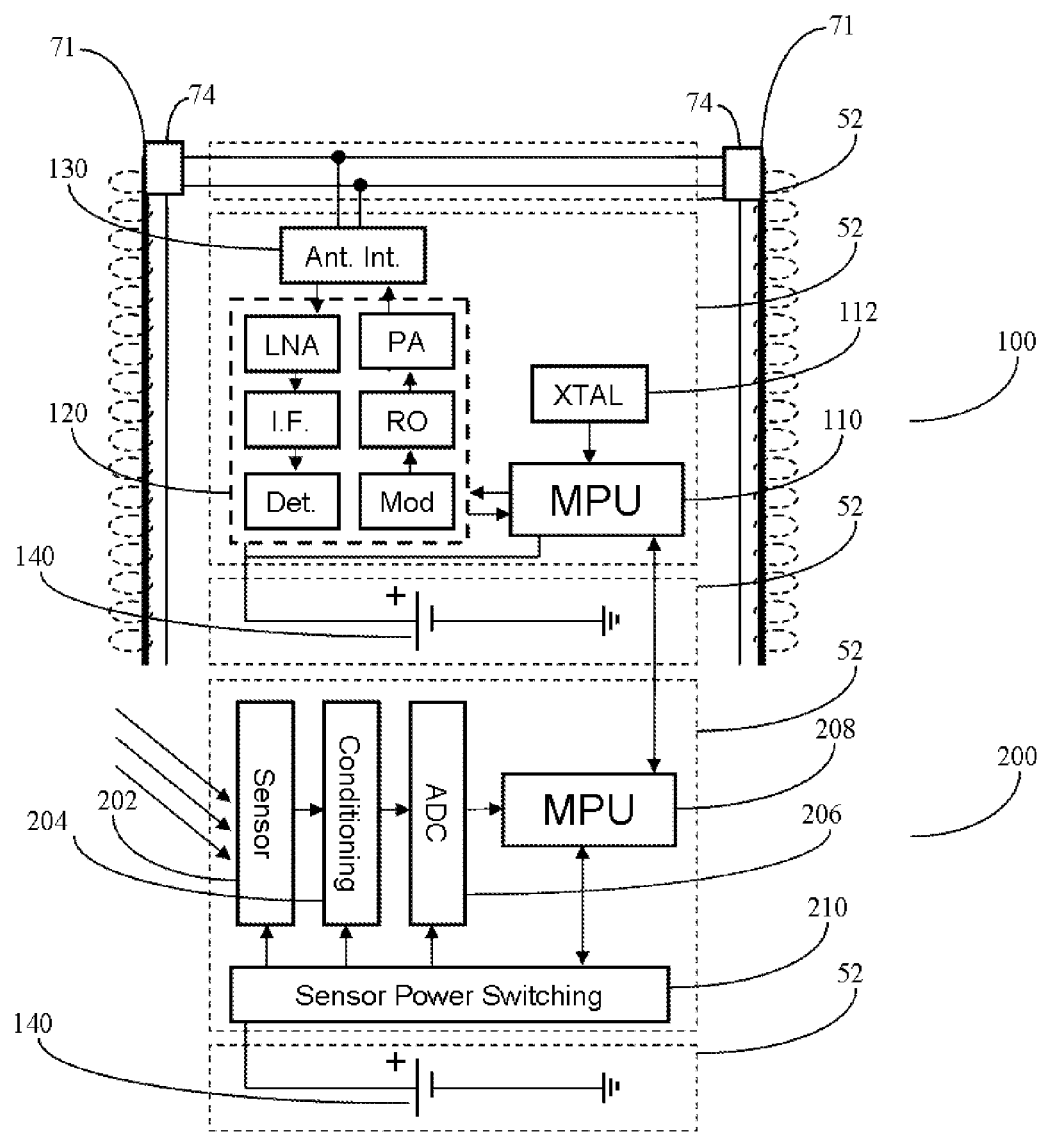
FIG. 15 is a conceptual block diagram of one portion of an active repeater box including sensors and sensor processing circuitry.

Any active repeater box 50 can be used as platform for local sensing and data gathering. FIG. 15 shows an exemplary repeater circuit diagram for a sensing-enabled active repeater. For clarity, only one of the typically two repeaters per repeater box are drawn in FIG. 15. The sensor circuit 200, which includes the sensor 202, conditioning circuitry 204, analog/digital converters 206, MPU 208 and power-switching circuitry 210 are housed in a cavity 52. The sensor and its circuitry are powered by a primary-cell battery 140. The repeater MPU 110 communicates with the sensor MPU 208 over a serial communications line to direct the sensor MPU 208 to switch on and off sensor power, to take sensor readings and to process and to communicate sensor data.

An example of data to be gathered along a drill string is local acceleration. Real-time acceleration, vibration and shock data that sampled at regular intervals along a drill string show the dynamical behavior of the drill string under actual conditions. The data is used to adjust the rate of rotation, the drilling speed and/or the weight-on-bit, among other adjustable drilling parameters. Suitable MEMS-based acceleration sensors for sensor 202 are available from Analog Devices. For example, the chip ADXL326 is housed in a 4 mm×4 mm package that fits together with an MPU from Microchip Technology, Inc. in a single cavity 52.

Sensor data is collected along the drill string by interrogating the repeaters 100 for data. The repeaters 100 respond by interrogating their attached sensor systems for data and by uploading packetized data. Alternatively, repeaters may automatically interrogate their attached sensor systems and/or may insert sensor data into data packets. The latter method is useful for detecting a condition in which sensor data exceeds a certain pre-defined threshold, such as a maximally allowed vibration level.

FIG. 16 shows a block diagram for a repeater circuit with multiple power sources. Operating a chain of repeaters at low average data rates dramatically reduces the duty cycle for each active repeater and therefore the active repeater's average power consumption to values well below 1 mW. In the microwatt range it is possible to harvest energy from the vibrational energy of the drill string. As shown in FIG. 16, a cavity 51 houses a solenoidal coil 250 consisting of up to several thousand turns of magnet wire. A permanent magnet 252 that is loosely suspended within the coil 250, moves relative to the coil as the drill string vibrates in the longitudinal direction. Since the magnet 252 is a lateral dipole, such movements induce voltages in the coil 250. These voltages are captured by a power conditioning circuit 254, where the raw fluctuating voltage is transformed into a voltage suitable for charging a storage capacitor 256. This capacitor in turn supplies the power conditioning circuit 254 and the repeater 100. A backup battery 140 provides power to the circuits during extended phases where vibrational energy is unavailable, such as when the drill pipe joint is racked up. Devices suitable for the power conditioning circuit 254 are available from Advanced Linear Devices, Inc., Sunnyvale, Calif. 94089.

Figure 17:
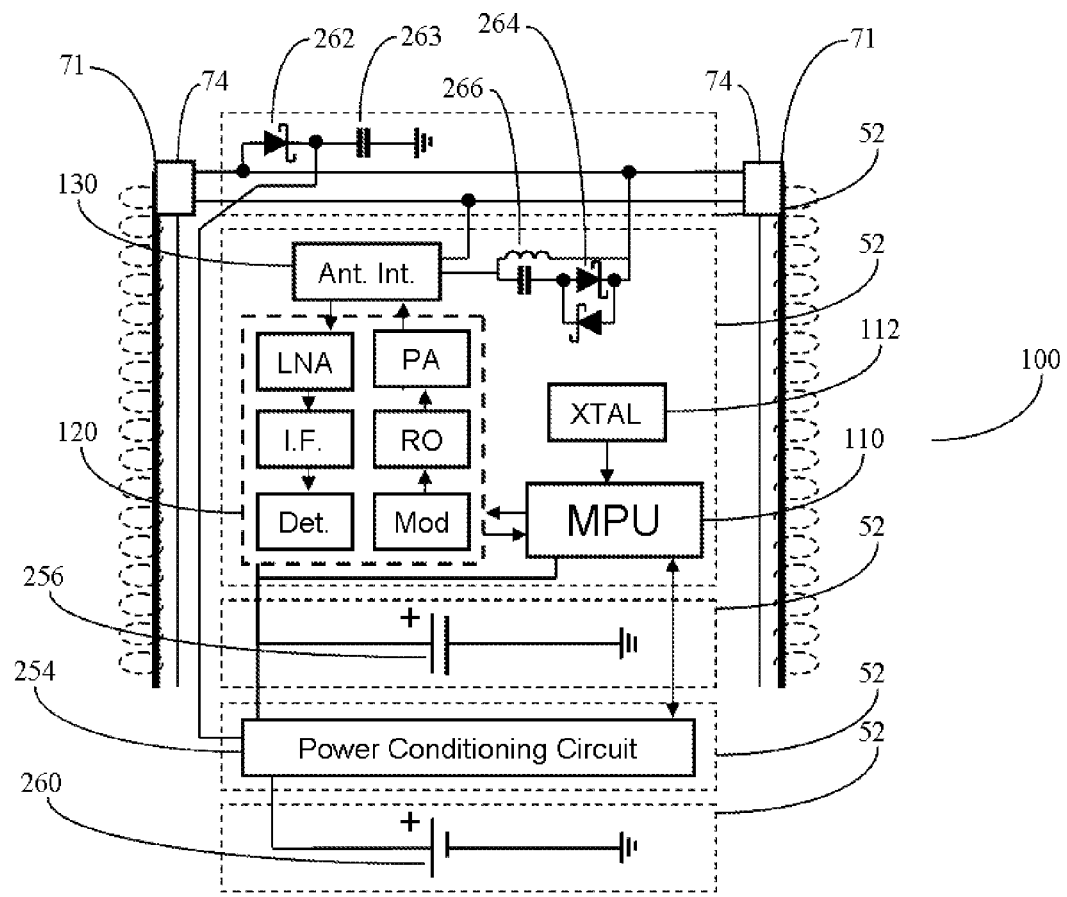
FIG. 17 is a conceptual circuit block diagram of one portion of an active repeater box including a rechargeable power supply and radiofrequency energy harvesting circuitry.

FIG. 17 shows the block diagram for a repeater circuit using rechargeable batteries. The EMR couplers are linear with respect to amplitude and power, i.e. they are capable of transmitting electrical power in addition to data signals. Whenever high-frequency power in the HF, VHF or UHF bands, in particular at the EMR frequency, and in excess of about 0 dBm (1 mW) is applied to one or both antennas 71, the high-speed rectifier 262 and the capacitor 263 convert the high-frequency power to a voltage suitable as input to the power conditioning circuit 254. The rectifier 262 is preferably a Schottky diode with a reverse recovery time of about 1 ns or below, such as the SD101 by Vishay Intertechnology, Inc., Malvern, Pa. 19355. The power conditioning circuit 254 stabilizes the raw input voltage and recharges the battery 260. The rechargeable battery 260 in turn supplies the power conditioning circuit 254 and the repeater 100. Rechargeable Lithium-ion batteries suitable for downhole operations are available from Saft, 93170 Bagnolet, France. The high-frequency power applied simultaneously triggers conduction in the Schottky diode pair 264. With the diode pair 264 conducting, a resonance tank circuit 266 is formed that is tuned to the EMR frequency. The resonating tank circuit presents a high series impedance and isolates the antenna interface 130 from the incoming burst of HF/VHF/UHF power.

Suitable recharging stations may be integrated into mobile units, into the surface communications sub 510 (see below) and/or into a charger box mounted atop the "monkey board", which holds the vertical pipe stands in the rig. In all cases the charger box contains an high-frequency power generator that supplies about 1 W per pipe stand. A cable manifold connects the charger box to adapters that each contain an EMR coupler of the "pin" type. Each adapter on the cable manifold interfaces with the topmost box of a pipe stand. Preferably, each adapter is attached to the pipe joint with a simple clamp system instead of a rotary connection. From the top, high-frequency power travels down the stand to one or more active repeater boxes that tap into the high frequency power to recharge their batteries. The total HF/VHF/UHF power supplied by the monkey board charger may be on the order of several 100 W.

A recharging station may also be integrated into a surface communications sub 510. It recharges the active repeaters that are located on top of the drill string, so the time available for recharge depends on the drilling progress. Since every application of HF/VHF/UHF power effectively "blinds" the repeaters, the HF/VHF/UHF transmitter is turned on only intermittently. Each energy burst of about 10 ms is synchronized to the current message packet timing such that the burst falls within unused gaps within the timing sequence.

Preferably, the rectifier 262 and capacitor 263 are part of every active repeater circuit, independent of the rechargeability of the power source or power sources. The instantaneous voltage generated at the capacitor 263 is used to wake up the MPU 110 from a power-savings mode in which the clock source 112 is turned off and the RF front end circuit 120 is turned off as well. The current consumption in such a power-savings mode can be kept at or below a few microamperes, i.e. the circuit can be powered in standby mode for very long periods from a single battery 140. The strong high-frequency signal generated by the recharging station that is integrated in the surface communications sub 510 does not require the amplification and frequency selectivity provided by the relatively power-hungry hardware blocks 112 and 120, but instead can be used to generate a wake-up signal for the MPU 110. Thus, the MPU 110 is notified that its repeater has become or is about to become part of a communication-enabled drill string, and the MPU 110 starts to execute the repeater algorithms, during which the clock source 112 and the RF front end 120 are powered up as needed and are powered down during idle periods.

Obviously, different methods of energy harvesting can be combined to take advantage of the fact that HF/VHF/UHF power is more readily available at the top of the drill string and vibrational energy emanating from the drill bit is more readily available at the bottom of the drill string. Furthermore, the harvesting methods may be combined with different combinations of primary and/or secondary cells. In the former case, the harvested energy is used to extend the service lifetime of the primary cells; in the latter case the service lifetime is only limited by the maximum number of charge/recharge cycles of the secondary cells.

Figure 18:
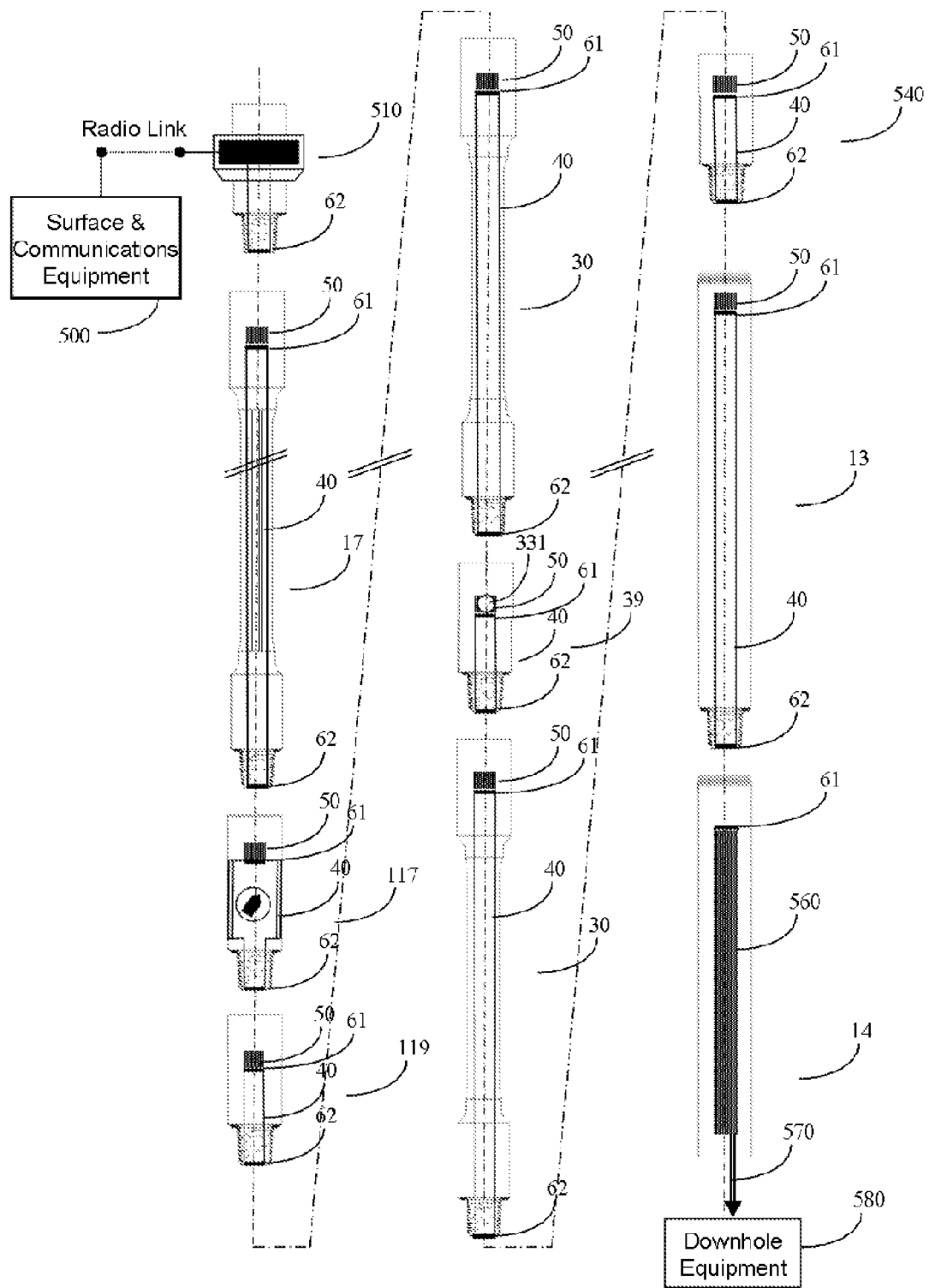
FIG. 18 is a conceptual view of a drill string containing various elements of the data transmission system.

FIG. 18 shows in some detail how entire data transmission systems are assembled from individual system components. In particular, an example of a table drive system using a kelly 17 is diagrammed. The components, shown in exploded, see-through view, from left to right and from top to bottom are the communications sub 510, the kelly 17, a lower kelly valve 117 (shown as an example how valves are instrumented) and a kelly saver sub 119.

The communications sub 510 translates the signals traveling on the data transmission system to signals compatible with existing surface equipment. Since the communications sub 510 is part of a rotating drill string, the communications sub 510 is preferentially battery-powered and exchanges signals with the surface equipment 500 via a radio link. Rig safety considerations, however, may demand wired-only communications, in which case an inner portion of the communications sub 510 rotates with the drill string and the outer portion is fixed with respect to the rig, allowing a cable to be run between the outer portion and rig equipment. The nature of the resonant coupling between EMR couplers 61, 62, 63 and 64 is such that a gap of several millimeters and, in the case of signal-only transmissions several centimeters, between proximate EMR couplers may be introduced, a feature that greatly simplifies the construction of a signal and/or power coupling mechanism between rotating and non-rotating parts of a drill string and/or drill rig equipment in that the gaps between couplers enable near-friction-free rotation between non-contacting couplers. The need for such couplings arise, e.g., at the point of the upper swivel, where the rotating drill string meets the non-rotating hook of the draw works, or within the communications sub 510.

Figure 22:
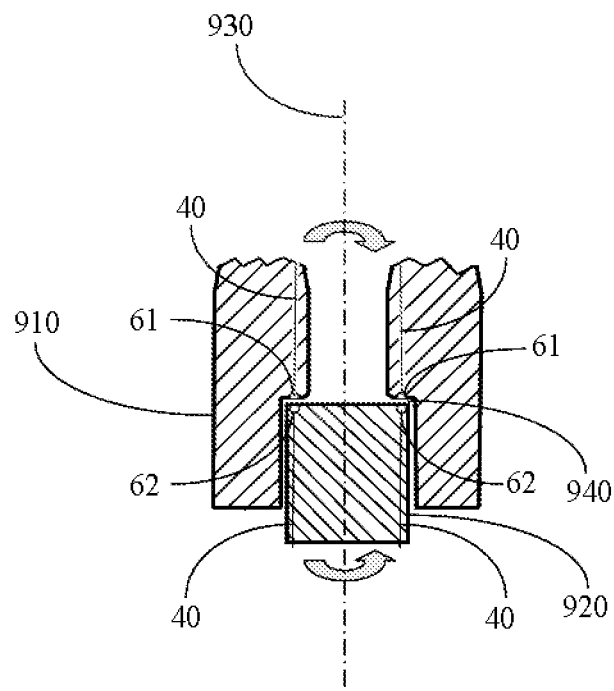
FIG. 22 is a conceptual cross-sectional view through a rotating coupling element.

FIG. 22 shows the conceptual cross-section of a freely rotatable coupling element. Two drill string components or elements 910 and 920 of a drill string component, e.g. a swivel assembly, a mud pulser, a mud siren, a mud motor, a rotating steerable tool (RST) or a drill bit, are free to rotate against each other and around a common axis 930. A fluid gap 940 on the order of 1 mm is deliberately introduced between the elements 910 and 920 in order to allow near-friction-free rotation. Typically, the need exists to pass electrical signals and/or power brushlessly between the elements 910 and 920. Such a need arises, for example, if the rotating drill bit contains remotely powered sensors that communicate sensor readings back to the BHA instrumentation. EMR couplers 61 and 62 are mounted on elements 910 and 920, respectively, and are connected by transmission lines 40 to other circuits contained in the drill string component(s). These circuits can generate and can process high-frequency signals suitable for passing power and/or data between the elements 910 and 920 by means of EMR coupling through the fluid gap 940. The gap 940 may contain drilling fluids or may contain fluids such as air or oil, such latter fluids being contained within the drill string component(s). Element 920 may be a rotating shaft that has mounted on it multiple EMR couplers 62 such that signals and/or power may be passed to or may be taken off the shaft through multiple non-rotating EMR couplers 61. Signals and/or power are conducted along the shaft through shaft-mounted, i.e. rotating, transmission lines 40. In such an arrangement, the couplers 61 and 62 are preferably arranged concentrically, i.e. are necessarily of unequal diameter. The resulting differences in antenna lengths are compensated for by adjusting the values of the capacitors embedded in each antenna to create antennas of equal electrical length throughout the system.

Above the communications sub 510 may be another valve or the swivel. The communications sub 510 interfaces to the rest of the transmission system via a set of pin EMR couplers 62. The kelly 17 is instrumented with the same transmission system components as a pipe joint, namely a repeater box 50, a box EMR coupler 61, transmission lines 40 and a pin EMR coupler 62. Below the kelly 17 is shown an optional kelly valve 117, used to retain the mud level column within the kelly 17 during make-up or break-out of rotary connection below. The valve housing contains repeaters boxes 50, box EMR coupler 61 and pin EMR coupler 62. Transmission lines 40 are routed from the box to the outside of the valve body and transition back into the valve body below the actual valve to connect with the pin EMR coupler 62. The kelly saver sub 119 is an inexpensive, short piece of equipment used as a wear item for frequent make-and-brake operations. It contains another set of repeater box 50, box EMR couplers 61 and pin EMR couplers 62, the latter connected by short transmission lines 40.

Diagrammed in the center column of FIG. 18 are two pipe joints 30 instrumented for data transmission and a short pup joint 39 instrumented for data transmission and remote sensing. For that purpose the pup joint 39 contains a sensor window 331.

As shown in the right column of FIG. 18, a crossover sub 540 translates between the different thread forms used for pipe joints 30 and for drill collars 13, respectively. The crossover sub 540 and the drill collars 13 are equipped for data transmission in similar fashion as the pipe joints 30. The downhole interface sub 560 is a piece of instrumentation housed in a drill collar 13 including EMR coupler 61, that translates the signals and protocols used by the data transmission system to and from the signals and protocols used on the BHA instrumentation bus 570. The implementation of this bus is service-company specific, but typically is a variant of MIL-STD-1553. Therefore, the interface electronics is partially generic and partially specific to the downhole equipment 580 provided by the MWD/LWD/directional drilling service company.

Figure 19:
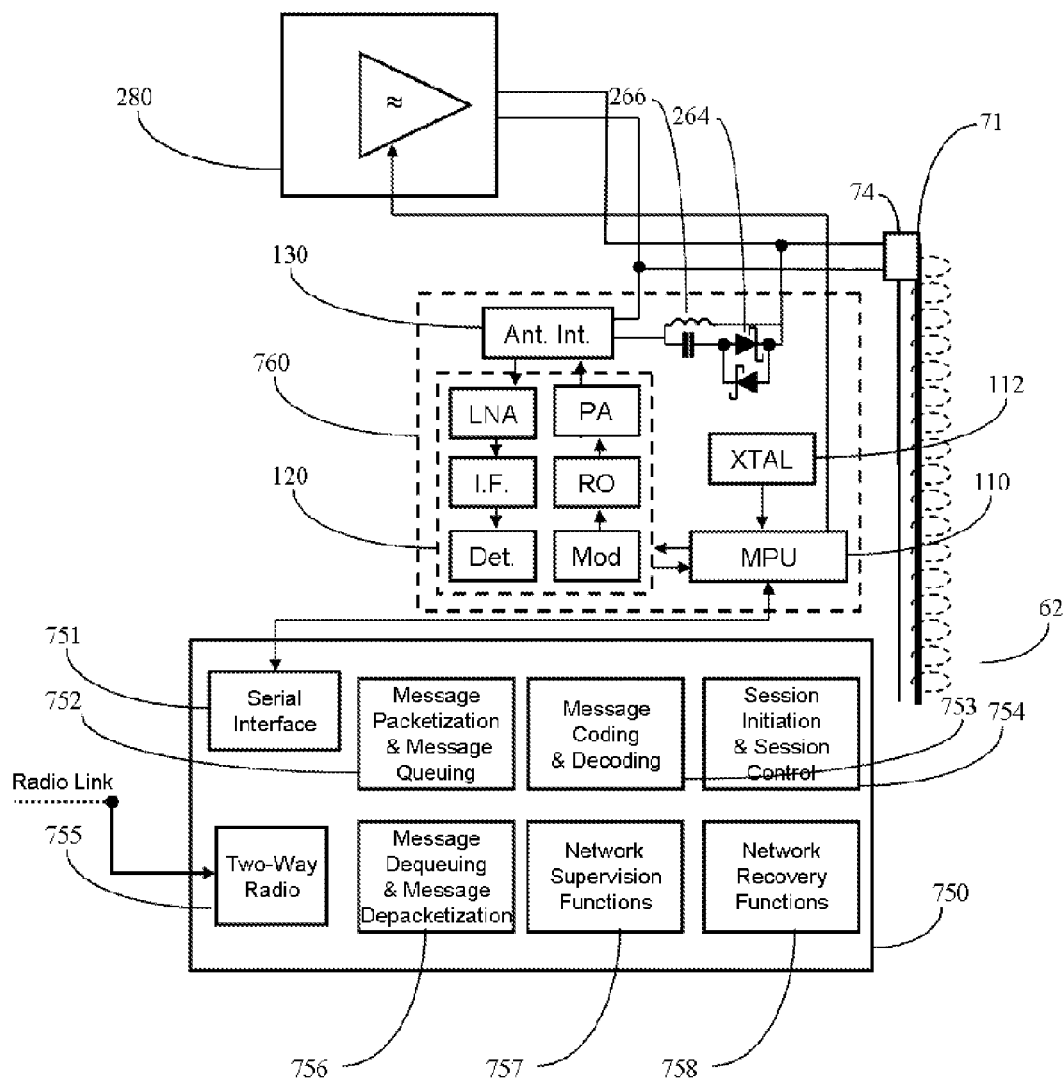
FIG. 19 is a conceptual circuit block diagram of a surface communications sub.

FIG. 19 is a schematic circuit block diagram of the surface communications sub 510. The circuit employs the same base core circuit 760 as the repeaters, including MPU 110, resonator 112, radiofrequency front end 120, antenna interface 130 and T/M capacitors 78 and 79. This core circuit is connected to a EMR coupler 62 that houses the antennas 71. An HF/VHF/UHF source 280, which is turned on and off under control of the MPU 110, generates high-frequency power for repeater boxes 50 with rechargeable power supplies. The source 280 is turned on during transmission breaks between message packets. The communications sub 510 is further augmented by additional processing and communication functions in communications block 750, including a serial interface 751 for communicating with the MPU 110, message packetization and message queuing block 752, message coding and decoding block 753, session initiation and session control block 754, as well as a two-way radio 755, message dequeuing and message depacketization block 756, network supervision block 757, and network recovery functions block 758 that together enable communications with the outside world. These additional functions handle the high-level end-to-end protocols including network supervision functions and connectivity to the outside world such as a rig data network via wireless links (as shown) or wired connections. Networking tasks performed in communications block 750 include, for example, the handling of user data, which arrives in variable length messages and its breakdown into fixed-length data packets (752); the encoding and decoding of message packets 753 (further discussed below); the supervision of communication sessions plus a variety of general supervision and network maintenance functions. In this context, a "communication session" denotes the activities between the time a continuous communication path between the downhole sub and the surface sub has been established and the time when this path is broken, for instance, when new pipe is added or a pipe joint is removed from the string. It is one of the tasks of the communication sub 510 to gracefully recover from a broken-path condition and to quickly re-establish communication as soon as the physical link has been re-established. The communications link to the rest of the surface equipment 500 may be implemented as a wireless radio link or as wired cable link.

Figure 20:
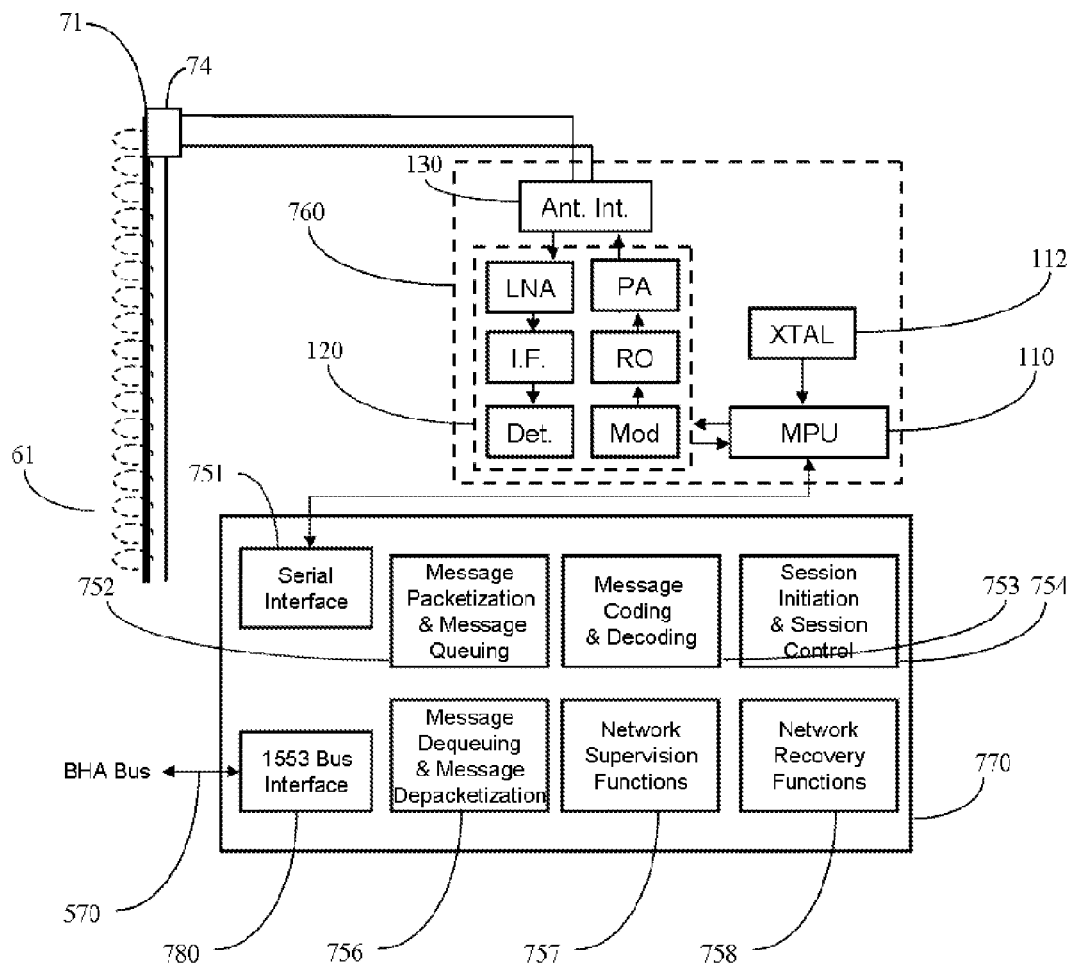
FIG. 20 is a conceptual circuit block diagram of a downhole interface sub.

FIG. 20 is a schematic circuit block diagram of the electronics inside a downhole/BHA interface sub 560. A core circuit 760 similar to the repeater circuit is employed to handle the radiofrequency and low-level communication functions, augmented by additional circuitry 770 responsible for high-level end-to-end communications, network supervision functions and communication with the BHA instrumentation bus. The core circuit 760 is connected to an EMR coupler 61. The downhole communications circuitry 770 is similar to circuit 750 except that the two-way radio 755 is replaced by the interface 780 to the BHA bus 570 (pictured as an example MIL-STD-1553 bus), which is specific to each LWD/MWD vendor.

Message packets may consist of 2,000 bits organized as 250 bytes. Each packet may be organized as follows: Preamble, message header, payload, cyclic redundancy checksum (CRC). The preamble consists of synchronization and arbitration bytes; the message header carries messaging information such as packet ID, packet length and packet TTL (time-to-live); the payload consists of user data. Of the 2,000 bits about 10% are allocated for overhead, which are all the bytes that are not payload bytes. An additional 5% transmission time is lost to switching and synchronization delays. The net user data throughput is about 56 kb/s.

EMR Coupler Design and Operating Frequency

The construction of the EMR couplers has been described in detail above. Selecting an optimum operating and antenna resonance frequency involves the consideration of several factors. The EMR couplers are based on the principle of weakly-coupled resonators, where "weakly coupled" implies an off-resonance coupling factor k of around 0.1. Without resonance, only small amounts of energy are coupled via a weak link. On resonance, however, proximate antennas interact strongly with each other as long as their individual Q factors are sufficiently high. Since several factors limit the attainable and the desirable Q factor, a certain amount of loss is unavoidable in every "hop" between EMR couplers. These losses can be minimized by choosing an optimal operating frequency.

In the relevant limit of k<<1 and Q>>1, the loss per EMR coupler pair can be approximated as follows:

$$\text{Hop loss} = -20 \log_{10}(1 + Z_0/(\omega_0 kLQ)) \text{ [dB]},$$

where $Z_0$ is the transmission lines' characteristic impedance (typically 50 ohm), $\omega_0$ is the resonance and operating frequency expressed in rad/s, k is the coupling factor, L is the antenna inductivity and Q is the antenna Q factor. The coupling factor k incorporates the basic geometry of the cavity formed by two proximate EMR couplers. At low k values, the resonance frequency $\omega_0$ of a coupler pair is approximately equal to the resonance frequency of a single, unpaired coupler. The Q factor is the ratio of antenna impedance $\omega_0 L$ to the ohmic antenna resistance $R_{ant}$. At the frequencies and temperatures of interest, $R_{ant}$ is dominated by skin effects and is about 0.5-1 ohm. The antenna impedance is about 50 ohm, thus Q factors of about 50-100 are attainable.

In addition to ohmic antenna losses, attenuation effects arise from a thin layer of drilling fluid that may be trapped between the surfaces of mated EMR couplers. The worst-case conductivity of such fluids is 100 S/m. In the frequency range of interest, this conductivity translates to an electrical skin depth of about 4 mm. Since double-shouldered connections are supposed to mate up on their secondary shoulders, the possible fluid gap is very narrow by design. Assuming an average fluid-filled gap of about 0.010" (0.25 mm), an attenuation factor of about −0.5 dB per gap is introduced.

The "hop loss" attenuation factor needs to be balanced against the losses within the coaxial cable. The cable losses can be described by:

$$\text{Cable loss} = -20 \log_{10}(e) R_{cable}/(2Z_0) \text{ [dB]},$$

where e is Euler's constant, $Z_0$ is the cable characteristic impedance (typically 50 ohm), and $R_{cable}$ is the ohmic resistance of a 10-m section of coaxial cable at the operating frequency and temperature.

The total signal attenuation in a pipe joint, as measured in decibels, is given by the sum of one hop-loss factor (direct pin-to-box coupling) or two hop-loss factors (coupling via passive repeaters) and the cable loss contribution. It can be seen that the hop losses decrease with increasing resonance frequency $\omega_0$ and that the cable losses slowly increase with frequency due to skin effect. The analysis of total attenuation as a function of frequency shows the dominance of hop losses below about 100 MHz, a fairly flat portion of the spectrum in the upper VHF frequency spectrum where hop losses and cable losses approximately balance, and increasing losses at higher frequencies due to cable losses and high fluid losses. The optimum operating frequency range under these conditions approximately corresponds to the VHF frequency spectrum that spans the range between 30 MHz and 300 MHz. In particular, the upper portion of the VHF band starting at 100 MHz has been found to be well suited.

If the coaxial cables are replaced with buried wires as transmission lines 40, more attenuation loss is attributable to the transmission lines than to the EMR couplers. Due to the opposing frequency dependencies of hop losses and wire losses, the buried-wire transmission system may be optimized by operating in the high HF range from 10 MHz to 30 MHz or in the low VHF range from 30 MHz to 100 MHz.

Algorithm Design

From the preceding description it should be clear that the topology of the network formed by active and passive repeaters is complex and semi-deterministic. However, it is highly advantageous to hide this complexity from the repeaters themselves and to define the behavior of a single active repeater in terms of a simple algorithm that is not demanding in terms of computing power and memory resources on the underlying MPU 110. The complexity and robustness of the network arises from the connectivity between many such repeaters and their quasi-random multi-stranded connectivity.

---

Basic Repeater Algorithm (BRA):

Do forever:
    1. Scan RF input for message packets.
    2. If a message packet is found:
    - Check if message CRC matches computed CRC.
    - If CRCs match, proceed, else discard packet and resume scan.
    - Check last-packet list for packet ID. If found, discard packet and resume scan.
    - Check packet ID for packet age. If too old, discard packet and resume scan.
    3. Conduct peer priority arbitration:
        - If arbitration is lost to peer, discard packet and resume scan.
        - Else proceed.
    4. Transmit packet.
    5. Update past-packet list.
    6. Update peer arbitration priority value.
Repeat forever.

---

The basic repeater algorithm places little demands on the computing capabilities of an active repeater. Basically, the repeater must be able to (a) detect and receive a message packet, (b) read some basic information from the message header, (c) compute a cyclic redundancy checksum (CRC) over the packet in real time, (d) buffer a single message packet and (e) transmit a message packet. As long as continuous communication path exists between the terminal ends of the network, i.e. between the surface communications sub and the downhole/BHA sub, message packets will be routed in both directions through the network as long as each active repeater follows the BRA.

The most compute-intensive portion of the BRA is the computation of CRCs over received and transmitted message packets. These calculations must take place in real time in order not to hold up the process of message retransmission. The MPU 110 uses a PIC24F16KA102 device that contains an internal CRC generator. During reception, the BRA feeds the incoming data stream into the CRC generator and only needs to compare the CRC bytes from the message header with the CRC generator output. During transmission, a new CRC needs to be computed since the repeater typically modifies the message header. While the packet content is fed to the RF front end, the outgoing data stream is also fed to the CRC generator and the resultant CRC bytes are appended to the outgoing data stream. Thus, the software is practically relieved of time-intensive calculations and can process and re-transmit message packets in back-to-back real time fashion.

A portion of the BRA arbitrates and coordinates time-sharing between repeaters 100 contained in the same repeater housing 50. Without such arbitration it would be possible for the repeaters to simultaneously transmit and interfere with each other's transmission. Arbitration is accomplished by programming each repeater with a random and unique arbitration value during manufacturing. At the start of each transmission, the repeater transmits the current arbitration value in on-off keying (OOK) mode while simultaneously listening to its input. At the first occurrence of a bit transmitted as "transmitter off" and received as "RF on," the repeater ceases transmission. Thus, only one repeater can "win" a specific transmission slot as repeaters with lower priority/arbitration values back off during the arbitration interval. After completion of a transmission, a repeater lowers its transmission priority, while the "losing" repeaters increase their respective priorities. Thus over time the repeaters will take turns forwarding packets causing load-leveling on their respective batteries. The OOK portion of the transmission does not affect the rest of the transmission that can be either in ASK (amplitude shift keying) or FSK (frequency shift keying).

The BRA is inefficient with respect to power consumption because it requires the repeater to remain in powered receive mode for most of the time. The modified repeater algorithm (MRA) emulates the BRA without the BRA's drain on battery power.

---

Modified Repeater Algorithm (MRA):

Do forever:
    1. Standby mode: Sleep for 9 seconds and sample RF for 1 second.
    2. If RF detected, proceed to Scan Mode, otherwise resume Standby Mode.
    3. Scan mode: Perform BRA Do/Repeat loop for 2 seconds.
    4. If no RF detected, drop back to Standby Mode.
    5. If repetitive transmission pattern identified, proceed, else go to Scan Mode.
    6. Execute BRA Do/Repeat loop per learned transmission pattern.
    7. If received packet pattern does not match learned pattern, go to Scan Mode.
Repeat forever.

---

The modified repeater algorithm takes advantage of the fact that the communications and downhole subs emit message packets in a deterministic fashion at intervals that are constant over the short term. In particular, the network terminals, i.e. communication and downhole subs, are required to adhere to 1-second repetitions. By observing the packet pattern, each repeater learns in what time windows it is required to receive and to transmit and spends the balance of the time in deep-sleep mode with virtual no power draw. At any time the transmitting terminal needs to change the data throughput, it temporarily holds back and buffers message packets. This mismatch between expected and actual packet traffic prompts each repeater to re-enter scan mode to learn a new pattern. Since scan mode is power-intensive, the network terminals will always buffer several packets to establish an average data rate and repetition pattern that can be held constant over prolonged periods of time.

The BRA and MRA are blind towards the actual direction of information as they repeat any incoming data. It is a characteristic of downhole telemetry that a continuous data stream from downhole sensors to the surface exist, while only sporadically control information needs to be downloaded to control drilling parameters. It is advantageous to utilize the present telemetry system in half-duplex mode, where for most of the time the entire bandwidth capacity is given over to sensor data upload. The downhole telemetry terminal interrupts the data stream periodically, e.g. once per minute, which causes all data to be flushed out of the network within about three seconds and causes all repeaters to enter scan mode. The repeaters are then primed to accept download data up to the full telemetry bandwidth. Download mode is terminated by another stop/flush/scan sequence, this time initiated from the surface.

The periodic network flushing operation is also designed to let the network recover from sudden hardware failures or software hang-ups. The sudden loss of a repeater in general causes a disruption in the message packet timing pattern resulting in a loss of packets at the point of failure. After a flush operation all repeaters scan the repetition timing window of one second for message packets, which will cause the repeaters that were in contact with the failed repeater to latch on signals and timing patterns emanating from more distant repeaters. The re-configuration of the network occurs automatically and the potential partial loss of communications is limited to one minute or less.

The transient loss of one or more data packets causes the network supervisory functions contained in each network terminal to investigate the possibility of a partial hardware failure that need to be identified, diagnosed and reported. Although the top priority is the restoration of the full data flow, on the next priority level, the network terminals send out diagnostic requests, to which the active repeaters respond with individual status responses. If a hard, i.e. non-transient hardware fault is present, the repeater(s) closest to the fault location will report a received signal strength indicator (RSSI) level that is lower than before the fault occurred. The drop may be small, depending on the distance between active repeater(s) and the fault location and the ability of the EMR circuitry to restore the signal in the intervening interval. However, based on periodic tracking of all RSSI values within the system, a process that accommodates the gradual changes associated with temperature and other "creep" effects, a non-continuous step change in RSSI, possibly accompanied by a loss of one or more message packets, is indicative of a hidden fault within the system. Based on the ID values of the repeaters with lowered RSSIs the network supervisory can typically narrow down the fault location to 1-2 drill pipe joints. The surface equipment memorizes these IDs and, once the identified repeaters are next-neighbors of the surface communications subs during the next pull-out-of-hole (POOH) operation, signals the operator to separate these upcoming pipe stands and to discontinue their use until they have been repaired.

The detection of failed or exhausted active repeaters simply involves the enumeration of all IDs of all repeaters known to be in the present system. The diagnostic request, acting as roll-call, brings up the IDs of all repeaters capable of communicating. Simple comparison with the roll-call result with the list of known repeaters yields the IDs, number and locations of disabled repeaters to be replaced during POOH.

Another characteristic of the MRA is the very low power draw of repeaters that are not part of an active network. Such a situation arises when individual pipe joints or partially assembled pipe segments are stored for later use. Without a data source, the BRA and MRA cause each repeater to cease RF transmissions and to enter standby mode. In standby mode, a repeater wakes up from very-low-power sleep every 10 seconds to activate the RF front end for 1 ms every 10 ms for a total time period of 1 s. Thus, a repeater will detect the presence of a transmitter while expending only 1% of the power required for full scan mode. Once the presence of a transmitter is detected, which in turn requires the network to be connected to at least one active terminal emitting data, scan mode establishes the required repeater pattern. The average standby mode current draw is 1% of 12 mA or 0.12 mA. A single sub-AAA lithium cell can continuously supply a repeater in standby mode for about 170 days. During pipe assembly, active repeaters exit standby mode and join an active network with an average delay of about 5 seconds.

A further modification to the BRA adjusts the amount of redundancy inherent in the system. The BRA as shown above allows a repeater to forward any given packet only once in order to avoid the proliferation of packets taking different paths through the network. Upon analyzing the received traffic pattern and in particular the number of dropped packets, one or both network terminals may instruct the chain of repeaters to implement additional redundancy to overcome a particularly electrical noisy environment. This switch is implemented through flags within the message header that indicate to each repeater a target number for the number of identical copies of message packets within the system. The terminals generate the appropriate number of message packets, e.g. one original and one identical copy per message packet. The repeaters forward the target number of message packet, i.e. they generate additional message copies if the number of copies is found too low and they drop message copies if their number is found to be too high. By simply following the BRA, which calls for destruction of un-repairable message packets, any repeater can recover the original message by simply waiting for the arrival of an identical copy. If the target number of message copies is not met, the repeater proceeds to generate additional packet duplicates. Since these duplicates can only be sent during idle times, the amount of packet redundancy selected impacts the maximum achievable data throughput.

Even at a message packet target number of 1, i.e. without explicit duplicates, messages duplicates are almost always available from near and from more distant repeaters. Therefore it is desirable for repeaters to latch onto distant-neighbor transmission patterns, which are received at lower power levels. If these low-level signals are unreliable as evidenced by CRC mismatches, the repeater can fall back on duplicate packets emitted from closer neighbors.

The BRA and MRA as presented above assume the presence of high-level protocols that implement sufficient message redundancy to recover data in the presence of interfering electrical noise resulting in some dropped message packets due to CRC mismatches. A useful extension of the BRA is the implementation of forward error correction (FEC). Using FEC, message packets of length N bits are no longer sent in plain code, but are encoded with additional k bits such that the correct information can be recovered with high probability from a distorted bit train of N+k bits. The so-called Raptor codes as described in "Raptor codes" by Shokrollahi, A., *IEEE Trans. Information Theory*, vol. 52, no. 6, June 2006, pp 2551-2567, have been found to be particularly useful for the present application. The additional k bits can be computed on a small MPU during the transmission of a message packet and the recovery of data from corrupted message packets can be performed in quasi-real time.

It is a characteristic of Raptor codes and their underlying family of codes that the code itself is not known a priori. It is advantageous to have the communication sub and the downhole interface sub analyze the data stream for a given period of time and then determine a suitable code. This code table is distributed as "plain" message, i.e. without being encoded, periodically to all repeaters for subsequent use in the encoding and decoding steps.

In the FEC version of the MRA, the MPU does not necessarily discard a message packet that does not pass the CRC test. Instead, the MPU waits for the arrival of another copy of the same message packet, and, if such a duplicate is not forthcoming or is faulty as well, proceeds to repair the corrupt message packet at hand. The repair process is performed as background operation such as not to interfere with the message timing pattern learned by and followed by the MRA. Repairing involves the steps of decoding the message payload based on the current code table, determining whether or not the plain text has been successfully recovered and by re-encoding the message.

If the repair operation successfully recovers the original data, the MPU re-inserts a repaired packet into the message stream. The re-insertion operation consists of setting an alert bit in the message header of a regular, repeated packet and transmitting the repaired packet after the regular packet. The alert bit causes the next and all subsequent repeaters to temporarily switch out of MRA to BRA and thus catching the out-of-order packet. Obviously, forward error correction can cause message packets to arrive in any order, requiring a message sequence counter as part of the message header. The receiving station re-assembles the correct data stream by decoding, re-ordering and merging the incoming message packets.

It should be understood that this invention is not limited to the particular embodiments disclosed, but it is intended to cover modifications within the spirit and scope of the present invention as defined by the appended claims. All such aspects of the invention are intended to be covered by the appended claims.

I claim:

1. A downhole signal and/or power transmission system for providing communications and/or power along a drill string of interconnected downhole components, comprising:
a plurality of downhole components, at least one of said downhole components comprising:
a first end containing a pin electromagnetic coupler adapted to provide resonant coupling, said first end mechanically interconnecting with an end of a first adjacent downhole component containing a box electromagnetic coupler; and
a second end containing a box electromagnetic coupler adapted to provide resonant coupling, said second end mechanically interconnecting with an end of a second adjacent downhole component containing a pin electromagnetic coupler,
wherein signals and/or power are exchanged among said downhole components by electromagnetic resonant coupling between pin electromagnetic couplers and box electromagnetic couplers of adjacent downhole components, said electromagnetic resonant coupling occurring at frequencies within the VHF or UHF bands between 30 MHz and 3 GHz.

2. A downhole transmission system as in claim 1, wherein said electromagnetic couplers are constructed from non-magnetic materials.

3. A downhole transmission system as in claim 1, further comprising at least one signal repeater that is electromagnetically coupled to the box electromagnetic coupler in said second end of said downhole component and is electromagnetically coupled to said end of said second adjacent downhole component.

4. A downhole transmission system as in claim 1, wherein said at least one downhole component further comprises a plurality of electric conductors connecting the pin electromagnetic coupler in the first end to the box electromagnetic coupler in the second end through said downhole component so as to form a plurality of parallel data paths between said pin electromagnetic coupler and said box electromagnetic coupler.

5. A downhole transmission system as in claim 4, wherein an electric fault in one of said data paths is substantially decoupled by weak off-resonance coupling from the remainder of said plurality of said data paths and wherein said electric fault is substantially bypassed by means of electromagnetic coupling between said electromagnetic couplers.

6. A downhole transmission system as in claim 4, further comprising at least one signal repeater that is electromagnetically coupled to the box electromagnetic coupler in said second end of said downhole component and is electromagnetically coupled to said end of said second adjacent downhole component, wherein said at least one signal repeater provides crossover capability between parallel data paths.

7. A downhole transmission system as in claim 3, wherein the second end of said downhole component houses said signal repeater.

8. A downhole transmission system as in claim 3, comprising a plurality of signal repeaters and at least one processor, wherein said processor:
receives message packets modulated on high-frequency signals;
detects faulty message packets; and
transmits correct message packets by modulating high-frequency signals with information.

9. A downhole transmission system as in claim 8, wherein at least one of said repeaters houses at least one of said processors.

10. A downhole transmission system as in claim 8, wherein said at least one processor is powered by said transmitted power.

11. A downhole transmission system as in claim 3, wherein said at least one signal repeater passively passes said signals and/or power.

12. A downhole transmission system as in claim 3, wherein said interconnected downhole components have rotary connections and at least some of said rotary connections are adapted to accept said at least one signal repeater.

13. A downhole transmission system as in claim 12, wherein said rotary connections are of the double-shouldered type.

14. A downhole transmission system as in claim 1, wherein said signals having information modulated thereon.

15. A downhole transmission system as in claim 1, wherein said downhole components comprise pipe joints, pup joints, crossover subs, communication subs, bottom hole assembly subs and/or repeater subs.

16. A downhole transmission system as in claim 1, wherein said pin electromagnetic coupler and said box electromagnetic coupler each comprises at least one substantially circular antenna and wherein said at least one antenna is placed in a substantially circular groove and wherein the remaining volume of said groove is filled with non-magnetic dielectric material.

17. A downhole transmission system as in claim 16, further comprising capacitors that relate the electrical length of each antenna to the length of the groove in which said at least one antenna is placed.

18. A downhole transmission system as in claim 1, wherein said pin electromagnetic coupler is separated from said end of said first adjacent downhole component by a first gap, said first gap containing electrically conductive or electrically insulating fluids; and/or
wherein said box electromagnetic coupler is separated from said end of said second adjacent downhole component by a second gap, said second gap containing electrically conductive or electrically insulating fluids.

19. A downhole transmission system as in claim 3, wherein said at least one signal repeater is separated from said box electromagnetic coupler in said second end of said downhole component by a first gap, said first gap containing electrically conductive or electrically insulating fluids; and/or wherein said signal repeater is separated from said pin electromagnetic coupler in said pin end of said second adjacent downhole component by a second gap, said second gap containing electrically conductive or electrically insulating fluids.

20. A downhole transmission system as in claim 3, wherein said at least one repeater comprises a repeater box having a plurality of cavities adapted to accept electronic circuits and energy storage units.

21. A downhole transmission system as in claim 3, wherein at least one of said signal repeaters comprises a sensor circuit including a sensor, conditioning circuitry, an analog/digital converter, a processor, and power-switching circuitry, wherein said sensor circuit is adapted to take sensor readings.

22. A downhole transmission system as in claim 21, wherein said sensor acquires sensor data comprising local acceleration data, vibration data, and/or shock data gathered along said drill string.

23. A downhole transmission system as in claim 3, wherein at least one of said signal repeaters comprises a solenoidal coil, a permanent magnet that is loosely suspended within the solenoidal coil so as to move relative to the solenoidal coil as the drill string vibrates in the longitudinal direction and to thereby induce voltages in the solenoidal coil, a power conditioning circuit that captures the induced voltages, and a storage capacitor that stores captured induced energy.

24. A signal and/or power coupling element for exchanging communications signals and/or power between drill string components and/or between elements of said drill string components, comprising:

a first electromagnetic coupler mounted on a first of said components or elements and adapted to provide resonant coupling; and a second electromagnetic coupler mounted on a second of said components or elements and adapted to provide resonant coupling;

wherein said communications signals and/or power are exchanged between said components or elements by electromagnetic resonant coupling between said first and second electromagnetic couplers, said electromagnetic resonant coupling occurring at frequencies within the VHF or UHF bands between 30 MHz and 3 GHz.

25. A coupling element as in claim 24, wherein said electromagnetic couplers are constructed from non-magnetic materials.

26. A coupling element as in claim 24, wherein said components or elements are rotatable and/or translatable with respect to each other while said communication signals and/or said power are being exchanged.

27. A coupling element as in claim 24, wherein said first electromagnetic coupler and said second electromagnetic coupler each comprises at least one substantially circular antenna placed in a substantially circular groove that is filled with non-magnetic material.

28. A coupling element as in claim 27, further comprising capacitors that relate the electrical length of each antenna to the length of the groove in which said at least one antenna is placed.

29. A method of providing communications along a drill string of downhole components comprising a plurality of interconnected downhole components having rotary connections, comprising the steps of:

generating high-frequency signals having information modulated thereon;

providing a plurality of signal repeaters spaced along said drill string of downhole components;

providing at least one downhole component having:

a first end containing a pin electromagnetic coupler adapted to provide resonant coupling, said first end mechanically interconnecting with an end of a first adjacent downhole component containing a box electromagnetic coupler, a second end containing a box electromagnetic coupler adapted to provide resonant coupling, said second end mechanically interconnecting with an end of a second adjacent downhole component containing a pin electromagnetic coupler, and at least one conductor connecting the pin electromagnetic coupler in the first end to the box electromagnetic coupler in the second end through said downhole components so as to form at least one data path between said pin electromagnetic coupler and said box electromagnetic coupler;

electromagnetically coupling said high-frequency signals from one of said first and second adjacent downhole components to said downhole component and/or to said signal repeater through said pin and/or box electromagnetic couplers by means of electromagnetic resonant coupling;

transmitting said high-frequency signals through said at least one data path of said downhole component to the other end of said downhole component; and electromagnetically coupling said high-frequency signals from said other end of said downhole component and/or from one of said signal repeaters to the other of said first and second adjacent downhole components through said pin and/or box electromagnetic couplers by means of electromagnetic resonant coupling, said electromagnetic resonant coupling occurring at frequencies within the VHF or UHF bands between 30 MHz and 3 GHz.

30. A method as in claim 29, wherein said pin and box electromagnetic couplers are constructed from non-magnetic materials.

31. A method as in claim 29, further comprising the step of providing a plurality of conductors connecting said pin electromagnetic coupler in said first end to said box electromagnetic coupler in said second end through said at least one downhole component so as to form a plurality of parallel data paths between said pin electromagnetic coupler and said box electromagnetic coupler.

32. A method as in claim 31, further comprising the step of said at least one signal repeater crossing said high-frequency signals from one parallel data path to another parallel data path.

33. A method as in claim 29, further comprising the step of a sensor circuit of at least one of said signal repeaters taking sensor readings.

34. A method as in claim 33, wherein said sensor acquires sensor data comprising local acceleration data, vibration data, and/or shock data gathered along said drill string.

35. A method as in claim 29, further comprising the steps of inducing voltages in a solenoidal coil in response to vibration of the drill string and storing induced energy.

36. A method as in claim 29, further comprising directing a processor of at least one of said signal repeaters to process message packets, to discard and/or repair faulty packets, and to transmit correct and/or repaired message packets by generating and modulating at least one high-frequency signal.

37. A method as in claim 29, further comprising the steps of: generating high-frequency power, electromagnetically coupling said high-frequency power to at least one of said signal repeaters, rectifying said coupled high-frequency power, and storing rectified energy.

38. A method of exchanging signals and/or power between drill string components and/or elements of said drill string components, comprising the steps of:
- generating high-frequency signals having information modulated thereon and/or generating high-frequency power;
- providing a first electromagnetic coupler adapted to provide resonant coupling, said first coupler being mounted on or in a first component or element;
- providing a second electromagnetic coupler adapted to provide resonant coupling, said second coupler being mounted on or in a second component or element; and
- electromagnetically coupling said high-frequency signals and/or said high-frequency power from said first electromagnetic coupler to said second electromagnetic coupler by means of electromagnetic resonant coupling between said first and second electromagnetic couplers, said electromagnetic resonant coupling occurring at frequencies within the VHF or UHF bands between 30 MHz and 3 GHz.

39. A method as in claim 38, wherein said first and second electromagnetic couplers are constructed from non-magnetic materials.

40. A method as in claim 38, further comprising the step of providing a gap between said first and second electromagnetic coupler, said gap accommodating fluids that may be electrically conductive or electrically insulating.

41. A method as in claim 40, further providing for the ability of said drill string components and/or elements to rotate and/or to translate relative to each other while said signals and/or said power are exchanged between said drill string components and/or elements.

42. A method as in claim 38, further comprising the steps of providing at least one processor and at least one sensor circuit, and said sensor circuit taking sensor readings.

43. A method as in claim 42, further comprising the steps of processing said sensor readings into digital information and of modulating said high-frequency signals with said digital information.

44. A method as in claim 42, further comprising the steps of rectifying said coupled high-frequency power, storing rectified energy and powering said at least one processor and/or said at least one sensor circuit from said rectified energy.

45. A downhole transmission system as in claim 4, wherein said plurality of electric conductors comprises a coaxial cable.

46. A downhole transmission system as in claim 4, wherein said plurality of electric conductors comprises a wire buried in pipe coating.

47. A method as in claim 29, wherein said at least one conductor comprises a coaxial cable.

48. A method as in claim 29, wherein said at least one conductor comprises a wire buried in pipe coating.

* * * * *